(12) United States Patent
Ganesan et al.

(10) Patent No.: US 12,200,576 B2
(45) Date of Patent: Jan. 14, 2025

(54) SELECTIVE RETRANSMISSION OF GROUPCAST DATA

(71) Applicant: Lenovo (Singapore) Pte. Ltd., New Tech Park (SG)

(72) Inventors: Karthikeyan Ganesan, Kronberg im Taunus (DE); Prateek Basu Mallick, Dreieich (DE); Joachim Loehr, Wiesbaden (DE); Alexander Johann Maria Golitschek Edler von Elbwart, Darmstadt (DE); Ravi Kuchibhotla, Chicago, IL (US); Vijay Nangia, Woodridge, IL (US); Robert T. Love, Barrington, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 18/366,480

(22) Filed: Aug. 7, 2023

(65) Prior Publication Data
US 2023/0388755 A1    Nov. 30, 2023

Related U.S. Application Data

(63) Continuation of application No. 17/948,078, filed on Sep. 19, 2022, now Pat. No. 11,785,425, which is a
(Continued)

(51) Int. Cl.
*H04W 4/06* (2009.01)
*H04B 7/06* (2006.01)
(Continued)

(52) U.S. Cl.
CPC ............ *H04W 4/06* (2013.01); *H04B 7/0617* (2013.01); *H04L 1/1816* (2013.01);
(Continued)

(58) Field of Classification Search
CPC ....... H04W 4/06; H04W 16/28; H04W 92/18; H04W 4/40; H04B 7/0617; H04B 7/0695;
(Continued)

(56) References Cited

U.S. PATENT DOCUMENTS

2008/0205385 A1    8/2008  Zeng et al.
2017/0171897 A1    6/2017  Ryu et al.
(Continued)

FOREIGN PATENT DOCUMENTS

WO    2010020078 A1    2/2010

OTHER PUBLICATIONS

Samsung, "On Physical Layer Procedures for NR V2X", 3GPP TSG RAN WG1 Ad-Hoc Meeting 1901 R1-1901048, Jan. 21-25, 2019, pp. 1-11.
(Continued)

*Primary Examiner* — Fitwi Y Hailegiorgis
(74) *Attorney, Agent, or Firm* — Kunzler Bean & Adamson

(57) ABSTRACT

Apparatuses, methods, and systems are disclosed for determining a feedback resource associated with groupcast data. One method includes receiving a configuration associated with a resource pool for PSFCH. The method includes receiving groupcast data via sidelink and determining HARQ feedback based at least in part on the received groupcast data. The method includes determining a PSFCH resource for the HARQ feedback based at least in part on the resource pool for the PSFCH and transmitting the HARQ feedback using the determined PSFCH resource.

20 Claims, 12 Drawing Sheets

Related U.S. Application Data continuation of application No. 16/786,497, filed on Feb. 10, 2020, now Pat. No. 11,470,452.

(60) Provisional application No. 62/803,363, filed on Feb. 8, 2019.

(51) Int. Cl.
*H04L 1/1812* (2023.01)
*H04L 5/00* (2006.01)
*H04W 16/28* (2009.01)
*H04W 92/18* (2009.01)

(52) U.S. Cl.
CPC .......... *H04L 5/0055* (2013.01); *H04W 16/28* (2013.01); *H04W 92/18* (2013.01)

(58) Field of Classification Search
CPC ................ H04L 1/1816; H04L 5/0055; H04L 2001/0093; H04L 1/1671; H04L 1/1893; H04L 1/1825
USPC ........................................................ 370/329
See application file for complete search history.

(56) References Cited

U.S. PATENT DOCUMENTS

| | | |
|---|---|---|
| 2017/0347394 A1 | 11/2017 | Yasukawa et al. |
| 2019/0199413 A1 | 6/2019 | Sundararajan et al. |
| 2020/0029318 A1* | 1/2020 | Guo ...................... H04L 1/1822 |
| 2020/0107170 A1 | 4/2020 | Chen et al. |
| 2020/0112400 A1* | 4/2020 | Lee ....................... H04L 1/1819 |
| 2020/0205165 A1 | 6/2020 | Huang et al. |
| 2020/0252989 A1 | 8/2020 | Chen et al. |
| 2021/0028891 A1 | 1/2021 | Zhou et al. |

OTHER PUBLICATIONS

Mediateck Inc., "Discussion on physical layer procedure", 3GPP TSG RAN WG1 Ad-Hoc Meeting 1901 R1-1900197, Jan. 21-25, 2019, pp. 1-9.

Oppo, "Physical layer procedure for NR-V2X", 3GPP TSG RAN WG1 Ad-Hoc Meeting 1901 R1-1900301, Jan. 21-25, 2019, pp. 1-10.

3GPP, "3rd Generation Partnership Project; Technical Specification Group Radio Access Network; NR; Study on Vehicle-to-Everything (Release 16)", 3GPP TR 38.885 V1.0.0, Nov. 2018, pp. 1-23.

3GPP, "3rd Generation Partnership Project; Technical Specification Group Radio Access Network; Evolved Universal Terrestrial Radio Access (E-UTRA); Physical layer procedures (Release 15)", 3GPP TS 36.213 V15.4.0, Dec. 2018, pp. 1-550.

3GPP, "3rd Generation Partnership Project; Technical Specification Group Radio Access Network; Evolved Universal Terrestrial Radio Access (E-UTRA); Physical layer; Measurements (Release 15)", 3GPP TS 36.214 V15.3.0, Sep. 2018, pp. 1-25.

3GPP, "3rd Generation Partnership Project; Technical Specification Group Radio Access Network; NR; Medium Access Control (MAC) protocol specification (Release 15)", 3GPP TS 38.321 V15.4.0. Dec. 2018, pp. 1-77.

* cited by examiner

SELECTIVE RETRANSMISSION OF GROUPCAST DATA

FIELD

The subject matter disclosed herein relates generally to wireless communications and more particularly relates to groupcast with beamformed selective transmission/retransmission.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Absolute Radio Frequency Channel Number ("ARFCN"), Authentication, Authorization and Accounting ("AAA"), Access and Mobility Management Function ("AMF"), Access to Restricted Local Operator Services ("ARLOS"), Positive Acknowledgment ("ACK"), Application Programming Interface ("API"), Authentication Center ("AuC"), Access Stratum ("AS"), Autonomous Uplink ("AUL"), AUL Downlink Feedback Information ("AUL-DFP"), Base Station ("BS"), Binary Phase Shift Keying ("BPSK"), Bandwidth Part ("BWP"), Cipher Key ("CK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Discontinuous Transmission ("DTX"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), E-UTRA Absolute Radio Frequency Channel Number ("EARFCN"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Integrity Key ("IK"), Internet-of-Things ("IoT"), International Mobile Subscriber Identity ("IMSI"), Key Derivation Function ("KDF"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Next Hop ("NH"), Next Hop Chaining Counter ("NCC"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'FIDU Session'), Packet Switched ("PS", e.g., Packet Switched domain or Packet Switched service), Primary Cell ("PCell"), Physical Broadcast Channel ("PBCH"), Physical Cell Identity ("PCI"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Sub scriber Identification Module ("SIM"), Tracking Area ("TA"), Transport Block ("TB"), Transport Block Size ("TB S"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Sub scriber Identification Module ("USIM"), UMTS Terrestrial Radio Access ("UTRA"), UNITS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the ACK and the NACK and DTX. ACK means that a TB is correctly received while NACK (or NAK) means a TB is erroneously received. DTX means that no TB was detected.

In certain wireless communication systems, sidelink transmission allows one UE device to communicate directly with another UE, e.g., via device-to-device ("D2D") communications. In one embodiment, an intermediary UE shares its connection to a base station with another UE via sidelink transmission. Sidelink communication may be unicast or groupcast. HARQ feedback for groupcast involves the receiving UE(s) ("RX UE(s)") sending feedback to the transmitting UE ("TX UE").

BRIEF SUMMARY

Disclosed are procedures for groupcast communication, e.g., with beamformed selective transmission/retransmission.

One method performed by a UE includes receiving a configuration associated with a resource pool for PSFCH. The method includes receiving groupcast data via sidelink and determining HARQ feedback based at least in part on the received groupcast data. The method includes determining a PSFCH resource for the HARQ feedback based at least in part on the resource pool for the PSFCH and transmitting the HARQ feedback using the determined PSFCH resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
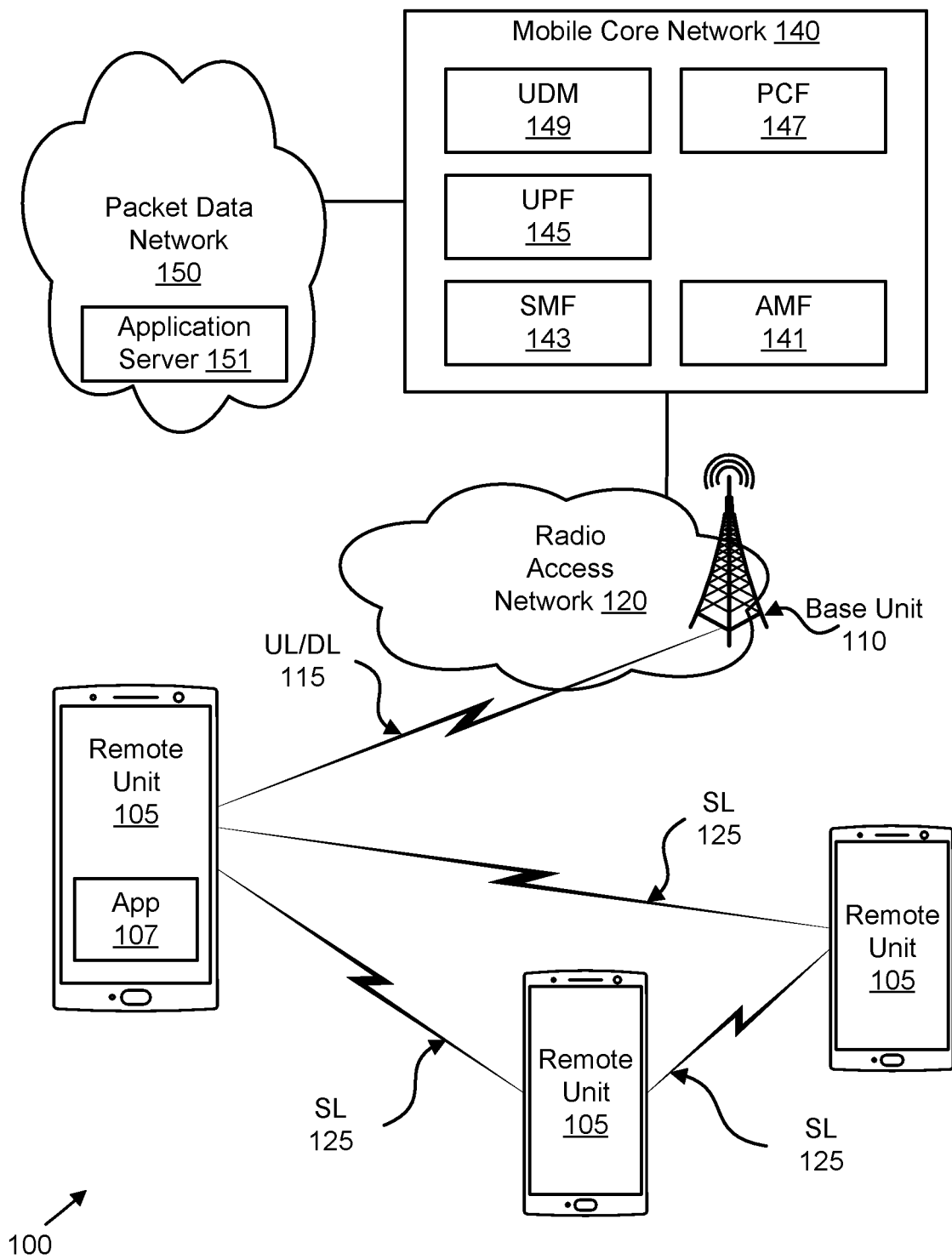
FIG. 1 is a schematic block diagram illustrating one embodiment of a wireless communication system for selective retransmission of groupcast data.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for groupcast with beamformed selective transmission/retransmission for remote units 105 engaged in sidelink communication. In 5G NR, sidelink ("SL") communication may support groupcast transmission and feedback for the groupcast message. In certain schemes, HARQ feedback for groupcast transmission comprises the receiver UE transmitting only HARQ NACK. It transmits no signal on PSFCH otherwise. Other schemes for HARQ feedback for groupcast transmission include the receiver UE transmitting both HARQ ACK and HARQ NACK feedback.

According to Option 1 of HARQ procedures for sidelink (unicast and groupcast), the Rx UE transmits HARQ-NACK on PSFCH if it fails to decode the corresponding TB after decoding the associated PSCCH. See 3GPP TR 38.885. According to Option 1 of HARQ procedures for sidelink (unicast and groupcast), the Rx UE transmits HARQ-ACK on PSFCH if it successfully decodes the corresponding TB.

It transmits HARQ-NACK on PSFCH if it does not successfully decode the corresponding TB after decoding the associated PSCCH which targets the Rx UE. See 3GPP TR 38.885.

For SL groupcast HARQ feedback signaling, the Physical Sidelink Feedback Channel (PSFCH) resource may be common to the Rx UEs. Alternatively, the PSFCH resource may be dedicated to each Rx UE. Dedicated resource for ACK and NACK transmissions increases the reliability of the groupcast transmission, but the feedback overhead is very high. However, using dedicated PSFCH resources allow the feedback information to cover all the NACK/ACK/DTX cases of all UEs in the group.

In certain embodiments, multiple Rx UEs may share a common PSFCH resource by allowing the failed Rx UEs (i.e., failed to decode the corresponding TB) to transmit HARQ-NACK on PSFCH, i.e., Option 1. This implies that HARQ-NACK is transmitted in an SFN manner when multiple Rx UEs fail to decode a PSSCH which results in reduced overhead for feedback signaling. There could be a case where some of the Rx UE failed to decode PSCCH, e.g., due to interference, half duplex problem, etc.

Note that the propagation characteristics of FR2 (e.g., 24.25 GHz to 52.6 GHz), require the use of beams for V2x sidelink to enable reliable data transmission and reception which requires sidelink CSI feedback reporting between the Tx UE and Rx UE. In NR sidelink, the beam reporting can be based on sidelink CSI-RS or sidelink SS/PBCH block. Accordingly, SL CSI feedback contents may include one or more of the following: RSRP, RSRQ, CQI, PMI, RI, CRI/SRI, and Interference conditions at Rx side. Moreover, the efficiency and reliability of retransmission may be improved if the Tx UE receives additional feedback information from Rx UE other than NACK.

FIG. 1 depicts a wireless communication system 100 for groupcast with beamformed selective transmission/retransmission for wireless devices communicating via sidelink communications 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141 and UDM 149. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the remote units 105 may communicate directly with each other (e.g., device-to-device communication) using sidelink ("SL") communication signals 125. Here, sidelink transmissions from a "transmitting" remote unit 105 (i.e., Tx UE) may be groupcast or unicast. Groupcast refers to group communications where the transmitting remote unit 105 in the group transits a multicast packet to all its group members, where the members of the group belong to the same destination group identifier.

In certain embodiments, the transmitting remote unit 105 groupcasts using an omnidirectional antenna. In other embodiments, the transmitting remote unit 105 groupcasts data using beam sweeping. As used herein, beam sweeping refers to the transmitting remote unit 105 transmitting the groupcast in predefined directions/beams in sequence, wherein the sequence is indexed and the sequence/index is transmitted as part of the sidelink control channel (e.g., in sidelink control information "SCI"). The transmitting remote unit 105 may dynamically signal (in SCI) information about transmission patterns and periodicity. For example, the transmitting remote unit 105 may transmit a signal (e.g., groupcast message) on a first beam during a first set of transmission symbol duration (e.g., first slot), transmit the signal on a second beam during a second set of transmission symbol duration (e.g., second slot), etc.

In certain embodiments, the transmitting remote unit 105 may conserve resources (e.g., radio/network resources, power, computational resources, etc.) by performing "partial" beam sweeping where one or more beams are "skipped" such that no transmission is made and the "skipped" beams are not a part of the beam sweeping pattern. Note that partial beam sweeping may also reduce latency as compared to full beam sweeping. Again, the transmitting remote unit 105 dynamically signals information about the pattern and timing of beam sweeping transmission (full or partial).

In some embodiments, the transmitting remote unit 105 retransmits the groupcast data by sending unicast messages to one or more members of the group. In various embodiments, the transmitting remote unit 105 performs "N-Unicast" transmission, which refers to the transmitting remote unit 105 performing unicast transmission to N receiving remote units 105 (e.g., establishing different Unicast links to the N receivers). N-Unicast transmission may occur either on the same or different time-frequency resources. Where the same time-frequency resources are used, the transmitting remote unit 105 may use spatial multiplexing techniques (e.g., beamforming), similar to Multi-User MIMO.

A "receiving" remote unit 105 may provide HARQ feedback to the transmitting remote unit 105. In various embodiments, SL communication signals 125 may be sent on frequencies in the Frequency Range 2 ("FR2") band, e.g., 24.25 GHz to 52.6 GHz. In some embodiments, SL communication signals 125 may be sent on frequencies beyond the Frequency Range 2 ("FR2") band, e.g., using the ITS band at 60 GHz to 70 GHz. SL communication signals 125 may include data signals, control information, and/or reference signals. Upon receiving a NACK message corresponding to a groupcast message from a receiving remote unit 105 (Rx UE), the transmitting remote unit 105 (Tx UE) may selectively retransmit the groupcast message as described in further detail below. In some embodiments, the transmitting remote unit 105 performs N-Unicast data retransmission to the receiving remote units 105 with beamforming to enhance the reliability (where N could be equal to 1 if only one receiving remote units 105 transmit NACK). In some embodiments, the transmitting remote unit 105 performs groupcast retransmission with partial beam sweeping or repetition with different beams in the direction of the subset of receiving remote units 105 to enhance the reliability. Here, the "subset" of receiving remote units 105 refers to some, but not all receiving remote units 105 (Rx UEs) in the group.

While FIG. 1 depicts components of a 5G RAN and a 5G core network, the described embodiments for groupcast with beamformed selective transmission/retransmission apply to other types of communication networks, including IEEE 802.11 variants, GSM, GPRS, UMTS, LTE variants, CDMA 2000, Bluetooth, ZigBee, Sigfoxx, and the like. For example, in an LTE variant involving an EPC, the AMF 135 may be mapped to an MME, the SMF mapped to a control plane portion of a PGW and/or to an MME, the UPF map to an SGW and a user plane portion of the PGW, the UDM/UDR maps to an HSS, etc.

Figure 2:
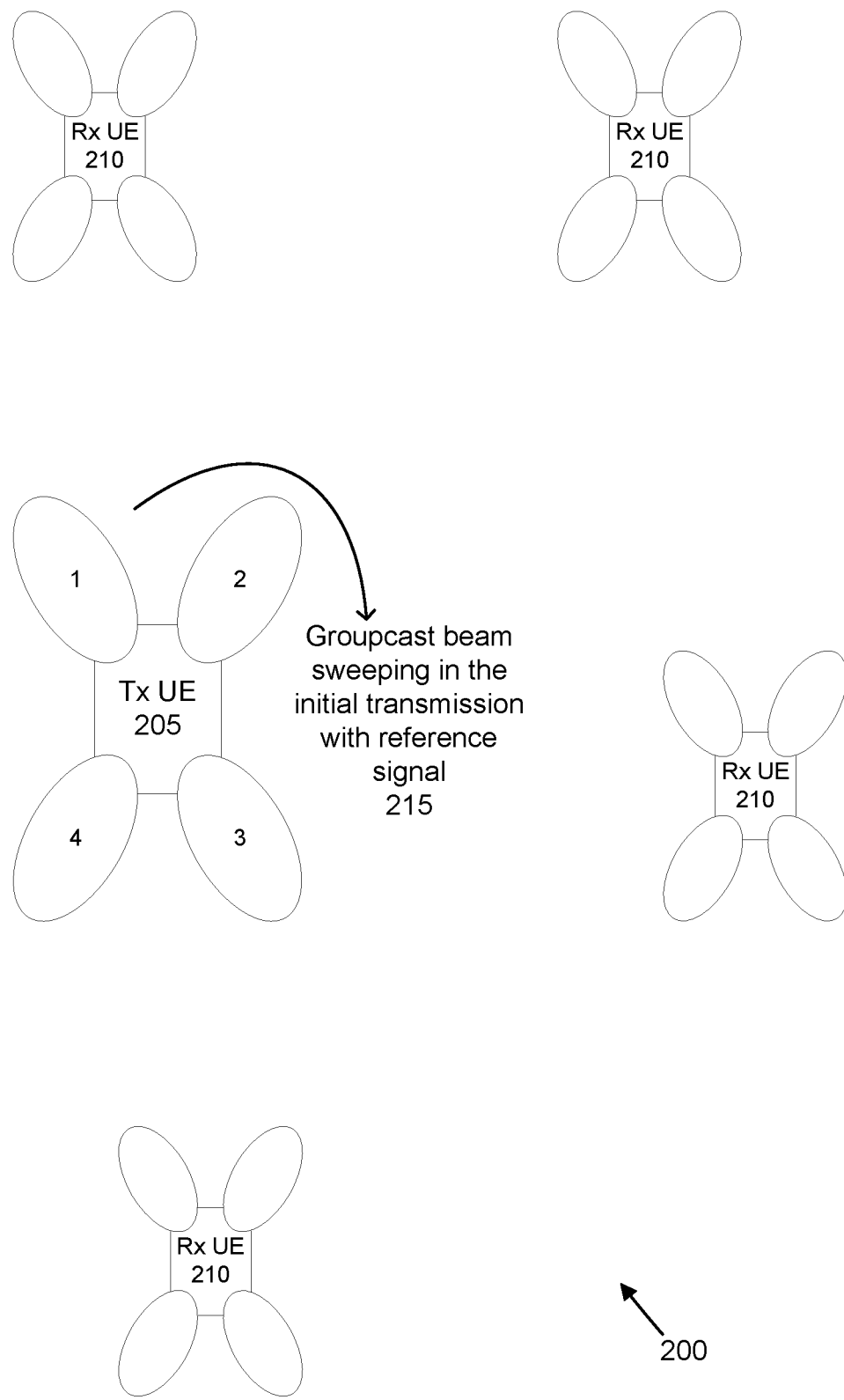
FIG. 2 is a diagram illustrating one embodiment of groupcast with beamforming for initial transmission.

FIG. 2 depicts a groupcast transmission scenario 200, according to embodiments of the disclosure. The groupcast transmission scenario 200 involves a transmitting UE ("Tx UE 205") 205 sends an initial transmission 215 to a set of receiving UEs ("Rx UEs 210") 210. The Tx UE 205 and each Rx UE 210 may be an embodiment of the remote unit 105.

The Tx UE 205 sends the initial groupcast transmission 215 to the group of Rx UEs 210 using beam sweeping. For ease of illustration, four beams are shown (with beam indices 1-4); however, the Tx UE 205 may transmit on more or few beams. Moreover, while a specific order of transmission is shown (e.g., specific beam sweeping direction), in other embodiments the beams of Tx UE 205 may have different indices and/or the transmission order may differ from that shown. In some embodiments, the beam IDs may be locally indexed relative to an antenna panel, with spatial separation for beams with the same beam index from different antenna panels achieved by the physical separation/placement of the antenna panels. In one embodiment, the beam ID may be a reference signal ID such as S-CSI-RS ID or SL-SSB ID. In another embodiment, the beam ID may be based on sidelink S-CSI-RS or SL-SSB information.

The Tx UE 205 communicates SCI to the Rx UEs 210. In certain embodiments, the SCI is transmitted along with a beam RS prior to the start of the groupcast transmission. In other embodiments, the Tx UE 205 transmits the beam RS (e.g., S-CSI-RS) along with the SCI and groupcast data transmission that is antenna-port quasi-co-located with the beam RS. In one embodiment, the beam RS is sent on the first symbol of the data transmission block associated with the beam. In the depicted embodiments, beam sweeping is used to transmit the different transmission blocks.

In one example, the SCI and groupcast data transmission QAM symbols are the same for all or a portion of the beams used for the data transmission. In another example, a data transmission on a first beam may use a first redundancy version (RV) and the data transmission of a second beam (different than the first beam) may use a second redundancy version. In certain embodiments, a Rx UE 210 may combine across multiple Tx beams to decode the received groupcast data transmission.

In certain embodiments, two or more transmission blocks are transmitted simultaneously if the Tx UE 205 supports capability of multiple simultaneous beams transmission and the Tx UE 205 has sufficient power. Here, the simultaneously transmitted beams may be from a same antenna panel or from different antenna panels (e.g., antenna panels on the front, back, left side, right side of the vehicles). The number of beams used for transmission of the data may be different for different antenna panels, e.g., depending on the size of the antenna panels (e.g. number of antenna elements), directivity and possible launch angles capability of the antenna panels, placement of the antenna panels on the vehicle, detection of local surrounding environment around the vehicle containing the Tx UE 205, e.g., no vehicles on one side, wall or blockage on one side, road lane in which the vehicle is in, direction of travel. The Tx UE 205 may select the number of beams to use based on other assistance information received from the gNB and/or other technologies such as radar/lidar and sensor systems on-vehicle, or information received from other non-3GPP RATs.

Figure 3:
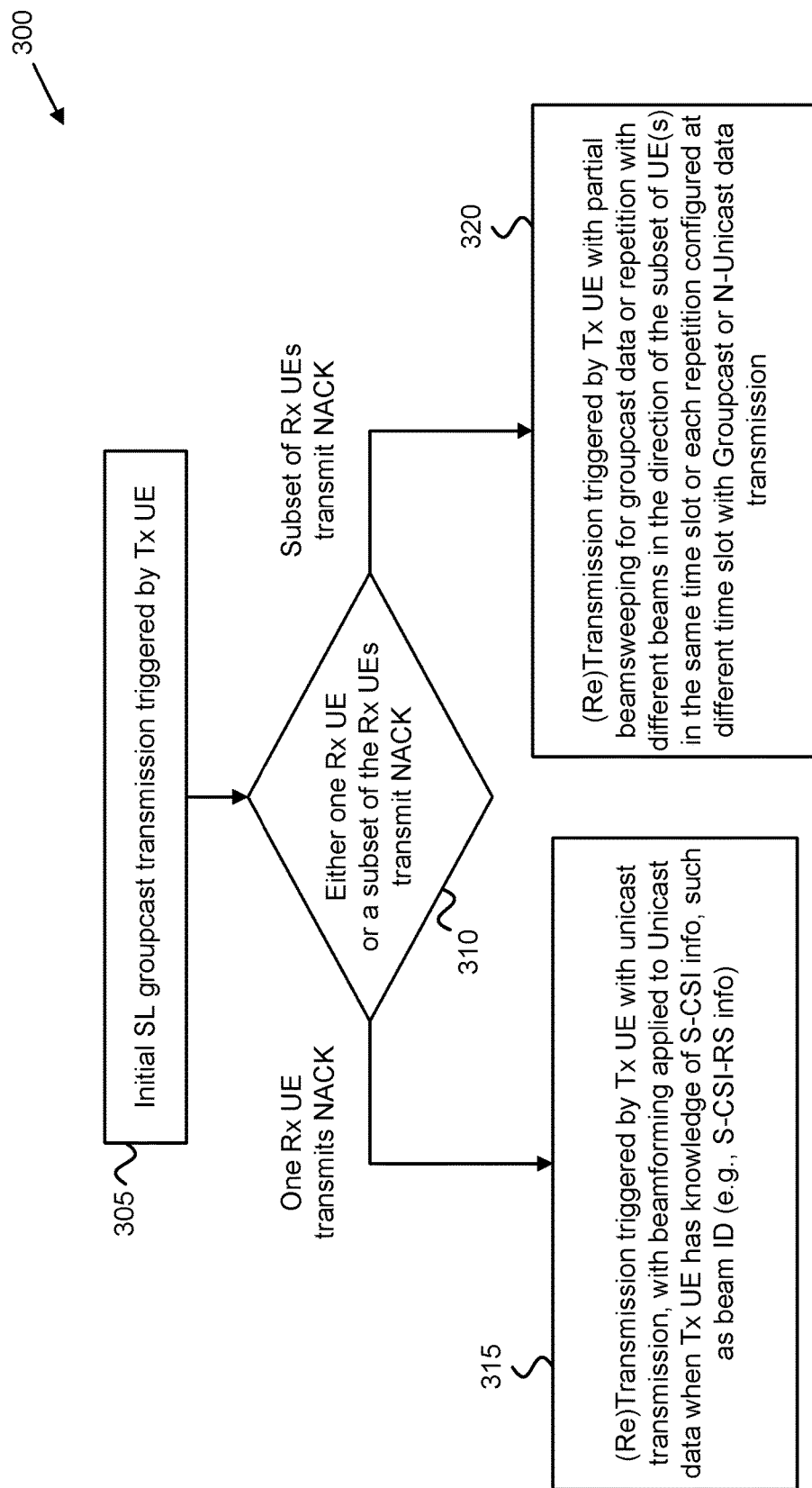
FIG. 3 is a flowchart diagram illustrating one embodiment of a procedure for groupcast with selective retransmission.

FIG. 3 depicts a procedure 300 for groupcast with beamformed selective transmission/retransmission, according to embodiments of the disclosure. The procedure 300 may be performed by a remote unit 105, such as the Tx UE 205. The procedure 300 begins with the initial SL groupcast transmission being triggered by the Tx UE 205 (see block 305). As discussed above with respect to FIG. 2, the initial groupcast transmission may use beam sweeping. Upon receiving HARQ feedback from the group of Rx UEs 210, the Tx UE 205 determines the number of Rx UE for which NACK was received, e.g., on dedicated resources (see block 310). If only one Rx UE 210 sends NACK feedback, then the Tx UE 205 triggers unicast retransmission (see block 315). Where the Rx UE 210 sending the NACK (referred to as a "NACK Rx UE 210") also provides sufficient sidelink channel state information ("S-CSI"), such as a beam ID (e.g., S-CSI-RS info), then the Tx UE 205 applies beamforming to the Unicast data (e.g., beamforms the retransmission).

However, if more than one Rx UE 210 transmits NACK, then the Tx UE 205 triggers retransmission of the data using either groupcast or N-Unicast transmission (see block 320). For groupcast retransmission, the data may be sent with partial beamforming or repetition with different beams in the direction of the NACK Rx UEs 210. Here, retransmission to the multiple NACK Rx UEs 210 may occur in the same time slot. Alternatively, each repetition of the data may be configured at different time slots. Again, where a NACK Rx UE 210 provides sufficient S-CSI, then the Tx UE 205 may apply beamforming to the retransmission.

In various embodiments, the UEs (e.g., Tx UE 205 and Rx UEs 210) are (pre)configured with the sidelink groupcast HARQ retransmission profile used to select the retransmission mode (e.g., groupcast or N-Unicast transmission) based on at least one of the QoS priority and the number of NACK(s). In one embodiment, the gNB/eNB (e.g., base unit 110) or a scheduling UE may configure the sidelink groupcast HARQ retransmission profile. In another embodiment, the Tx UE 205 autonomously decides the sidelink groupcast HARQ retransmission profile based on the priority of the transmission and/or congestion metric, interference value, etc.

The Tx UE 205 indicates in the SCI bit about one of the various options of the feedback requested from the Rx UE 210(s) such as: a) Rx UE 210 is to transmit only HARQ NACK on the common sidelink feedback resource; b) Rx UE 210 is to transmit HARQ ACK/NACK on a dedicated sidelink feedback resource; or c) Rx UE 210 is to transmit HARQ NACK+S-CSI information on a dedicated feedback resource. In certain embodiments, the common sidelink feedback resource to use is indicated in the SCI. In certain embodiments, the dedicated sidelink feedback resource to use is indicated in the SCI.

In one example, the dedicated sidelink feedback resource may be a pool of feedback resources, and the Rx UE 210 selects a resource for HARQ feedback from the indicated pool of resources (e.g., based on Rx UE 210 ID or SL ID). The pool of feedback resources may be indicated by the gNB, may be indicated by the TX UE 205 in the SCI, or may be determined based on the SCI information. For example, the gNB may configure and indicate a first pool of feedback resources, and a second pool of feedback resources (which is a subset of the first pool of feedback resources) may be determined based on e.g., QoS priority which may be indicated in the SCI.

The Tx UE 205 may dynamically configure in SCI during retransmission from common SL feedback to dedicated SL feedback or from dedicated SL feedback to a subset of dedicated SL feedback based on certain policy like number of NACK(s) received, etc. In one embodiment, the different PSFCH format which could be based on HARQ ACK/NACK or S-CSI can be dynamically configured during retransmission in SCI.

In one embodiment, the Tx UE 205 uses the Uu interface (gNB to UE communication) TA (Timing Advance) value for SL transmission (as done in LTE V2V), i.e., TA value used relative to received Uu interface DL timing is used for SL transmission. Here, the Tx UE 205 may include the TA (Timing Advance) value it uses in the SCI. The Rx UE 210 (Rx UE 210) may estimate the TA or the propagation delay to the SL Tx UE based on the TA value of the Tx UE 205 and the TA value of Uu interface of the Rx UE 210.

Tx UE 205 transmit-timing relative to Rx UE 210 Uu transmit-timing may be calculated as: $(TA_1-TA_2)/2$, where $TA_1$ is the Uu TA for the Rx UE 210 transmit-timing, and $TA_2$ is the Tx UE 205 TA. The Rx UE 210 may determine the SL receive-timing relative to its Uu Tx transmit-timing as $T_{SL,Rx}$ based on the received SL. Here, a positive value represents a delay relative to Uu Tx transmit-timing, while a negative value represents an advance relative to Uu Tx transmit-timing.

Additionally, the Rx UE 210 may determine the propagation delay to the Tx UE 205 based on $T_{SL,Rx}$ and $(TA_1-TA_2)/2$, for example calculated as: $T_{p12}=T_{SL,Rx}-(TA_1-TA_2)/2$. Further, a known offset may be applied to the $T_{p12}$ value to allow for different SL Tx and Rx slot boundaries and a corresponding TA value for the feedback Tx may be determined. Accordingly, the Rx UEs 210 SL feedback transmissions (e.g., on common or dedicated feedback resources) may be time-aligned at the Tx UE 205 receiver and be received within the CP duration.

The use of a different TA value from the TA value used for Uu for the Rx UE 210 transmission e.g., feedback channel (or generally for any transmission where the Rx UE 210 is expected to receive simultaneous transmission from more than one UEs), may be beneficial when the SL coverage area is relatively large (e.g. >100 m), so that the Rx UE 210 transmissions signals sent to the Tx UE 205 are received well within the CP, and not/minimally sacrifice the max channel-delay spread protection of the CP.

Because the propagation characteristics of FR2 is susceptible to blockage and require the use of beams for reliable data transmission and reception, sidelink CSI feedback reporting may be required between the Tx UE 205 and Rx UE 210(*s*). One example of S-CSI feedback reporting is the Rx UE 210 reporting best beam ID. Here, the sidelink receive beam ID may be based on sidelink S-CSI-RS or SL-SSB information. The beam ID may also be a reference signal ID such as S-CSI-RS ID or SL-SSB ID.

Figure 4:
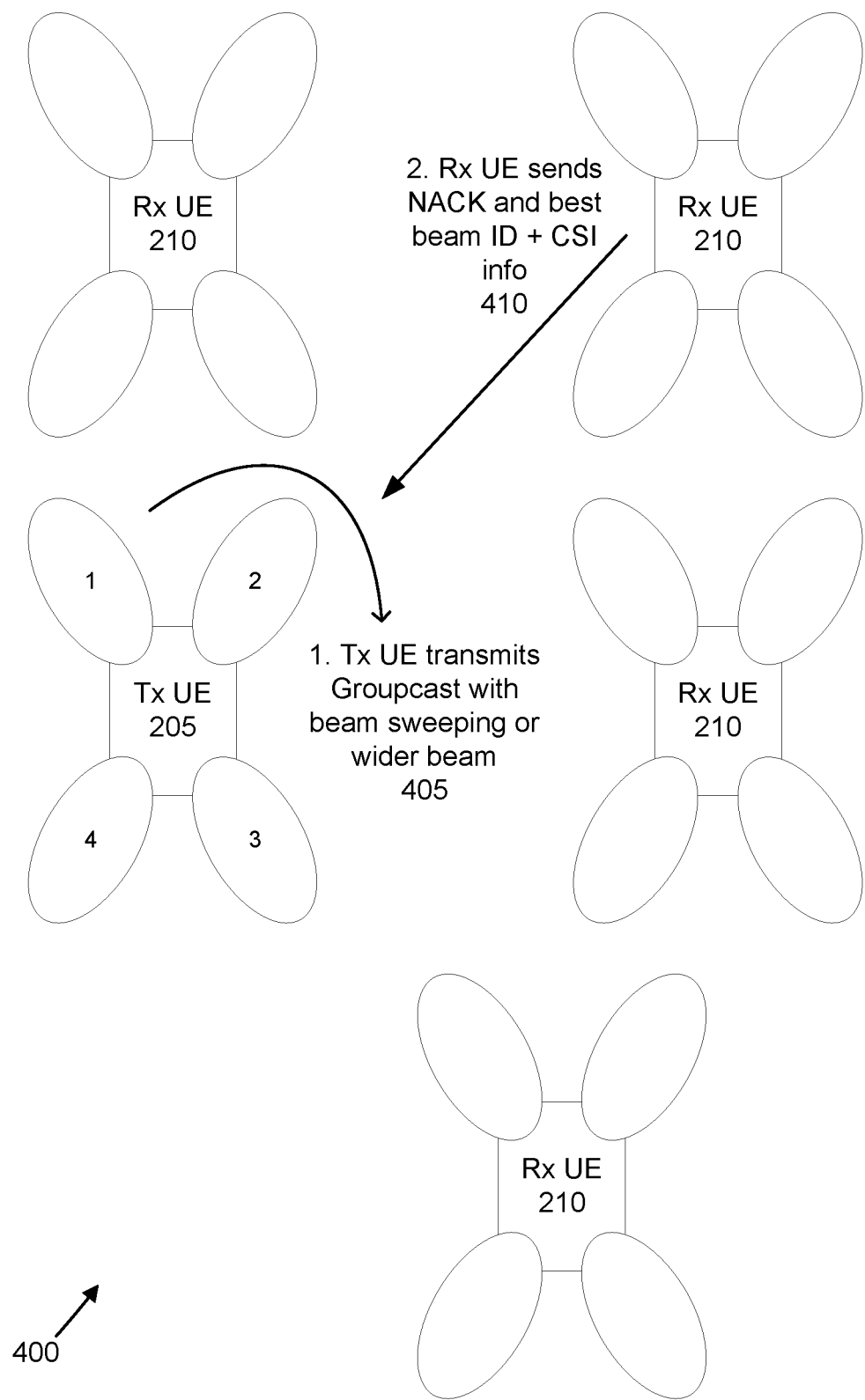
FIG. 4 is a diagram illustrating one embodiment of Rx UE transmitting both HARQ feedback and beam/signal feedback.

FIG. 4 depicts a feedback scenario 400, according to embodiments of the disclosure. The feedback scenario 400 involves the Tx UE 205 sending a groupcast transmission 405 to the group of Rx UEs 210 and at least one Rx UE 210 sending "enhanced" feedback 410. The groupcast transmission 405 may be sent using beamsweeping or using a plurality of wider beams. Here, the enhanced feedback 410 includes a HARQ ACK or NACK indication (or HARQ-NACK indication), and/or a best beam ID used for transmission by the Tx UE 205 and S-CSI information.

In one example, the feedback information may include of location information or information from which the location of Rx UE 210 can be inferred by the Tx UE 205. In one example, the information may be global location coordinates of Rx UE 210. In another example, the information may be relative positioning information such as spatial and angular measurements (Angle-of-Arrival/Angle-of-Departure) e.g., for the latest received transmission from Tx UE 205. The Tx UE 205 can use such location information to beamform in the desired direction of the Rx UE 210.

In one example, the feedback information may include recommendation on relative transmit power (to power level used for current/latest transmission) for the retransmission, e.g., −1, 0, +1, +3 dB power change. The retransmission data may use a different redundancy version (RV) that the initial (first) transmission, which may be indicated in the SCI information. In one example, the initial (first) transmission and the retransmission may each be self-decodable. In one example, the retransmission power level may be different than the initial transmission power level. The difference may be dependent on the QoS priority of the data.

In some embodiments, the Tx UE 205 transmits SCI indicating the beam indices in the initial groupcast transmission that correspond to the groupcast data transmission. Here, the Beam information could be S-CSI-RS or a Reference signal identifier (e.g. an explicit value or an implicit Index value in the order of appearance in the list) before or along with the initial groupcast data transmission. The transmission occasion includes the time slot/symbols of the data and/or S-CSI-RS/any RS using different beam ID is dynamically or semi statically signaled.

In some embodiments, the Tx UE 205 transmits the beam RS (e.g., S-CSI-RS) (e.g., with beam sweeping on each of the beams) prior to the start of the groupcast data transmission. In certain embodiments, SCI is transmitted together with the beam RS prior to the start of the groupcast data transmission. The number of beams used for the groupcast may be included in the SCI. The beam RS scrambling sequence may be based on the SL UE ID, and/or the symbol/slot index, and/or the beam index. The SCI associated with the beam RS may include the beam ID used for the transmission.

In various embodiments, the Rx UE 210 determines the best Rx beam to use for reception of the groupcast data transmission based on the received beam RSs. In certain embodiments, a known offset or offset between the beam RS transmission and the groupcast data transmission may be indicated in the SCI information. In one example, the offset is determined based on the number of beams used for the groupcast which is indicated in the SCI, e.g., the groupcast data transmission in symbol block n (or data transmission index n) is antenna-port quasi-co-located with the beam RS sent in symbol block n-N, where N is the number of beams indicated in the SCI. A symbol block can include one or symbols.

In other embodiments, the Tx UE 205 transmits the beam RS (e.g., S-CSI-RS) along with the SCI and groupcast data transmission that is antenna-port quasi-co-located with the beam RS. In certain embodiments, the beam RS is sent on a first symbol of the data transmission block associated with the beam.

As discussed above, the Tx UE 205 may use beam sweeping to transmit the different transmission blocks. In one example, the SCI and groupcast data transmission QAM symbols are the same for all or a portion of the beams used for the data transmission. In another example, a data transmission on a first beam may use a first redundancy version (RV) and the data transmission of a second beam (different than the first beam) may use a second redundancy version. In one example, the Rx UE 210 may combine across multiple beams to decode the received groupcast data transmission.

In one example, two or more transmission blocks may be transmitted simultaneously if the Tx UE 205 supports capability of multiple simultaneous beams transmission and the UE has sufficient power. The simultaneous transmitted beams may be from a same antenna panel or different antenna panels (e.g., antenna panels on the front, back, left side, right side of the vehicles). The number of beams used for transmission of the data may be different for different antenna panels e.g., depending on the size of the antenna panels (e.g. number of antenna elements), directivity and possible launch angles capability of the antenna panels, placement of the antenna panels on the vehicle, detection of local surrounding environment around the vehicle e.g., no vehicles on one side, wall or blockage on one side, road lane in which the vehicle is in, direction of travel. The UE may make decision on the number of beams to use based on other assistance information received from the gNB and/or other technologies such as radar/lidar and sensor systems on-vehicle, or information received from other non-3GPP RATs.

In various embodiments, groupcast data (along with S-CSI-RS or any RS) are being transmitted with a certain interval by the Tx UE 205. The groupcast may be transmitted via a specific beam radiated in a certain direction. Each data transmission may be identified by a unique number called data transmission index (DTI) which are indexed from ascending order in time from 0 to L−1 and dynamically signaled within SCI. As depicted in FIGS. 2 and 4, multiple Rx UEs 210 are located around Tx UE 205. Each Rx UE 210 measures the signal strength based on the RS it detected for a certain period and identifies the best beam with the strongest signal strength. If the decoding fails at a Rx UE 210 for one of the Data (PSSCH) packet, then that Rx UE 210 sends feedback NACK bits along with the best beam ID and/or the corresponding received signal strength. In various embodiments, the feedback is sent on dedicated resources. The dedicated resources may be semi-statically configured by the gNB/eNB or by another scheduling UE in the same group for every PSFCH formats and provided to all UEs in the group. The feedback information can also include CSI information like PMI, covariance matrix etc., as described above.

In certain embodiments, the Tx UE 205 may explicitly specify a certain PSFCH format in the SCI for feedback. Additionally, the Rx UE 210(s) 210 may implicitly or explicitly feedback for an omni-directional transmission, for example by not providing the best beam information. In some embodiments, the Rx UE 210 may provide the feedback using a transmit beam using a spatial transmission filter corresponding to receive spatial domain transmission filter for receiving the data transmission (e.g., transmit with the same spatial domain transmission filter used for the reception of the groupcast data transmission and beam RS and UE capable of beam correspondence).

Figure 5:
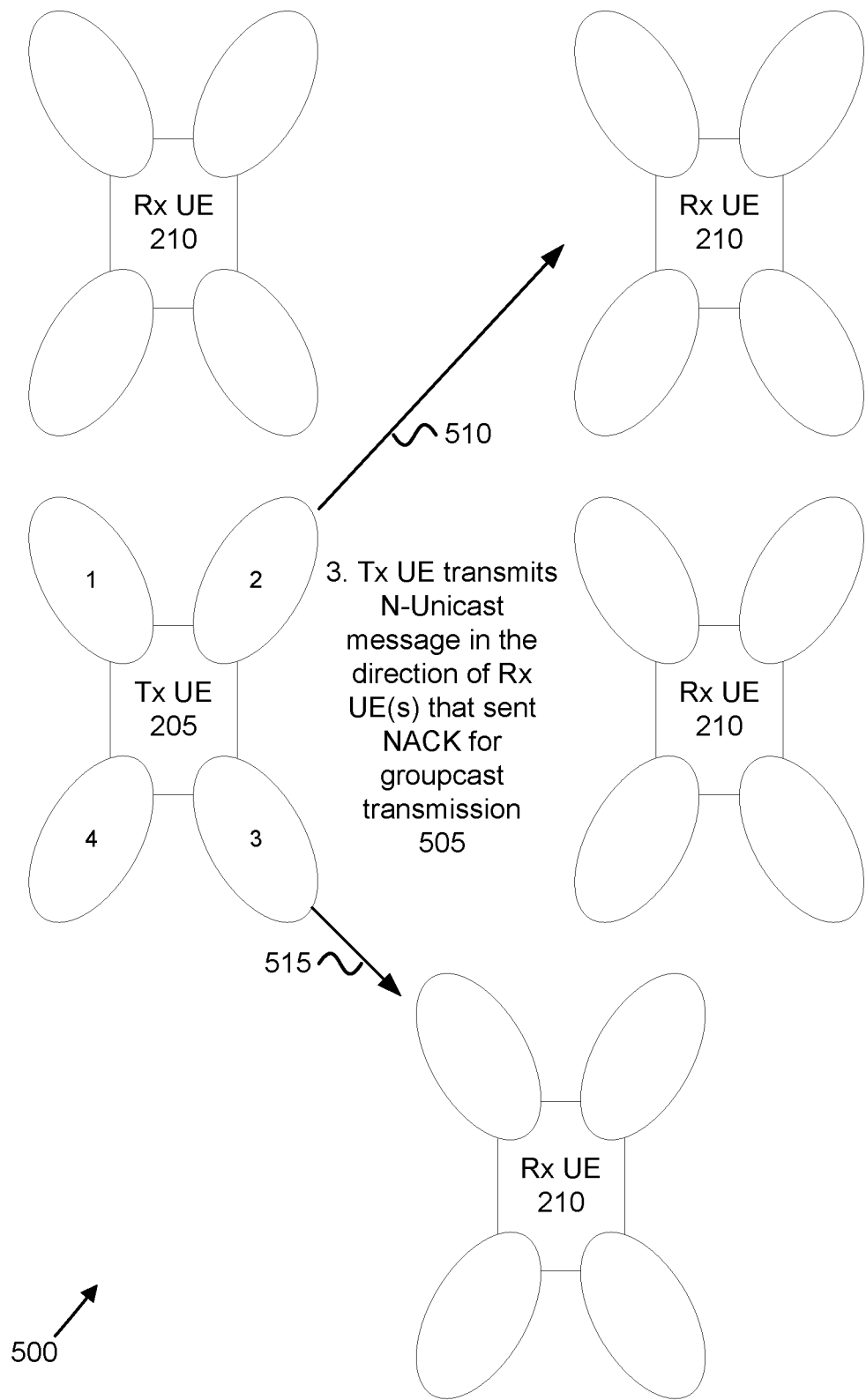
FIG. 5 is a diagram illustrating one embodiment of Tx UE retransmitting with unicast beamforming.

FIG. 5 depicts a retransmission scenario 500, according to embodiments of the disclosure. The retransmission scenario 500 involves the Tx UE 205 sending a second transmission 505 of the groupcast data to a subset of the Rx UEs 210 (e.g., after receiving the HARQ NACK feedback). Here, the Tx UE 205 sends to those Rx UEs from which HARQ NACK feedback was received. Here, the Tx UE 205 has received a NACK and additional feedback information, as described above with reference to FIG. 4, for one or more of the Rx UEs 210.

In one case, the second transmission is a retransmission with different redundancy version (e.g., where each RV is self-decodable). In another case, the Tx UE 205 transmits a first beam with one RV and second beam (different than first one) with second RV without waiting for the feedback. In various embodiments, the Tx UE 205 selectively retransmits data to a subset of the Rx UEs 210.

In some embodiments, the Tx UE 205 may retransmit with unicast transmission. From the additional feedback information, the Tx UE 205 knows the best beam ID of the Rx UE 210(s) that transmit NACK(s) (or other suitable feedback information) and thus can establish the unicast beam in the direction of Rx UE 210(s). The Tx UE 205 may retransmit using N-Unicast to the subset comprising N Rx UEs 210. In the depicted embodiment, a first unicast retransmission 510 is sent to the upper-right Rx UE 210 and a second unicast retransmission 515 is sent to the lower-right Rx UE 210, in response to both Rx UEs 210 sending NACK to the Tx UE 205.

In other embodiments, the Tx UE 205 may retransmit using partial beam sweeping as described above. Here, the Tx UE 205 uses the best beam ID (or other suitable feedback information) to identify which beams to skip when retransmitting.

Figure 6:
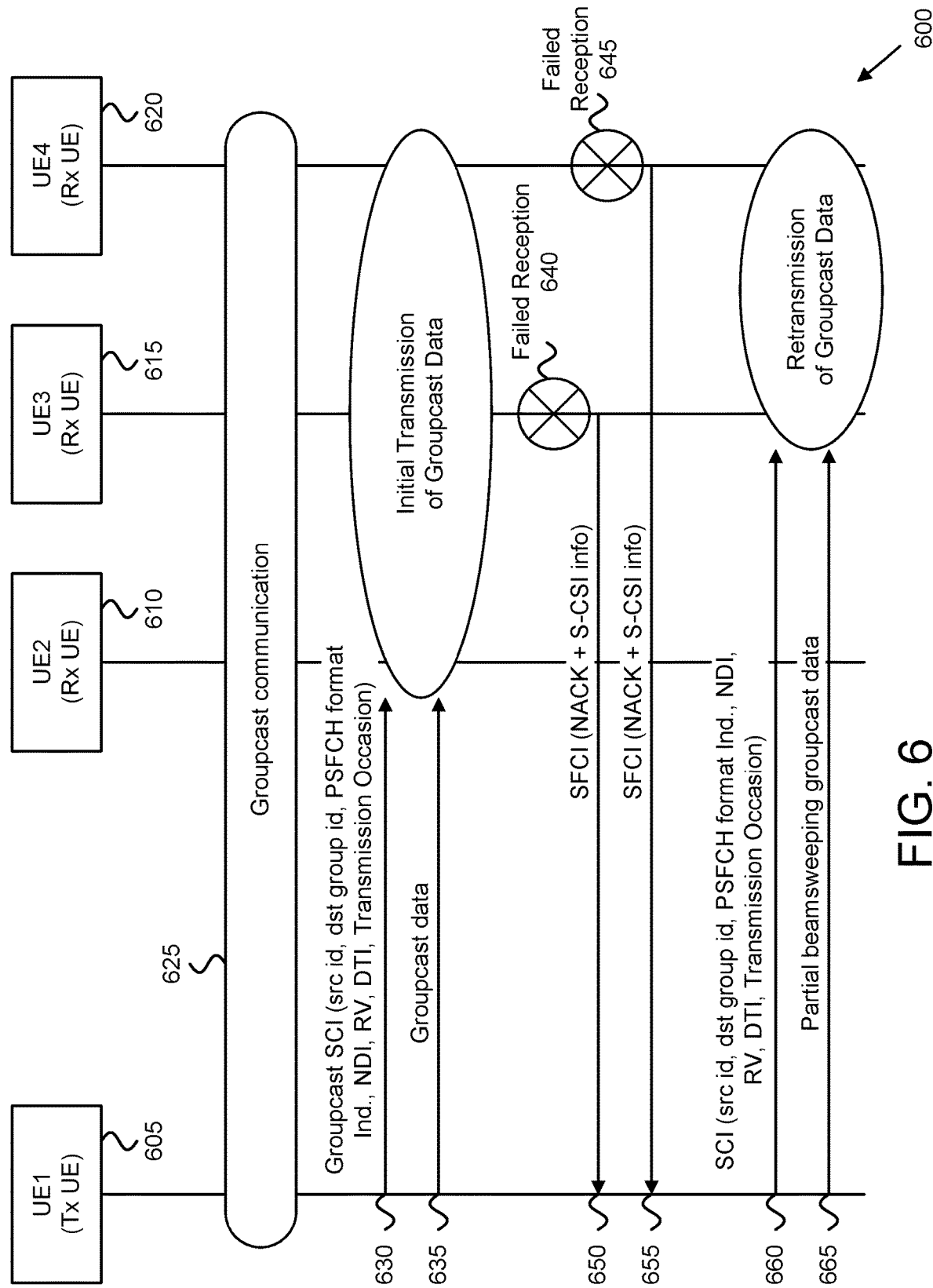
FIG. 6 is a diagram illustrating one embodiment of a call flow for groupcast transmission.

FIG. 6 depicts a call flow 600 for selective retransmission, according to embodiments of the disclosure. The call flow involves four UEs (i.e., UE1 605, UE2 610, UE3 615, and UE4 620) using groupcast communication. Each UE may be an embodiment of the remote unit 105 described above.

After establishing the groupcast communication 625, the UE1 605 (e.g., the Tx UE) sends groupcast SCI 630 to the group. Notably, the groupcast SCI 630 contains a PSFCH format indicator, a data transmission index ("DTI") value, and a transmission occasion value. The UE1 605 also sends groupcast data 635 (e.g., using beam sweeping, as described above).

In the depicted embodiment, the UE2 610 receives and successfully decodes the groupcast data; however, the UE3 615 and UE4 620 fail to successfully decode the groupcast data (see failed receptions 640 and 645). The UE3 615 and UE4 620 each determine S-CSI information (including best beam ID) and transmit sidelink feedback content information ("SFCI") to the UE1 605 containing NACK and S-CSI feedback (see SFCI 650 and 655).

The UE1 605 sends second SCI 660 (e.g., to the subset UE3-UE4) containing PSFCH format indicator, a DTI value, and a transmission occasion value. Additionally, the UE1 605 uses the S-CSI feedback from UE3 615 and UE4 620 to selectively retransmit the groupcast data to UE3 615 and UE4 620. In one embodiment, the UE1 uses partial beam sweeping 665 to retransmit the data. In other embodiments, instead of retransmitting using beam sweeping, the UE1 605 uses N-Unicast to retransmit the data. Here, the UE1 605 may use the S-CSI information to establish unicast beams in the direction of UE3 615 and UE4 620.

Figure 7:
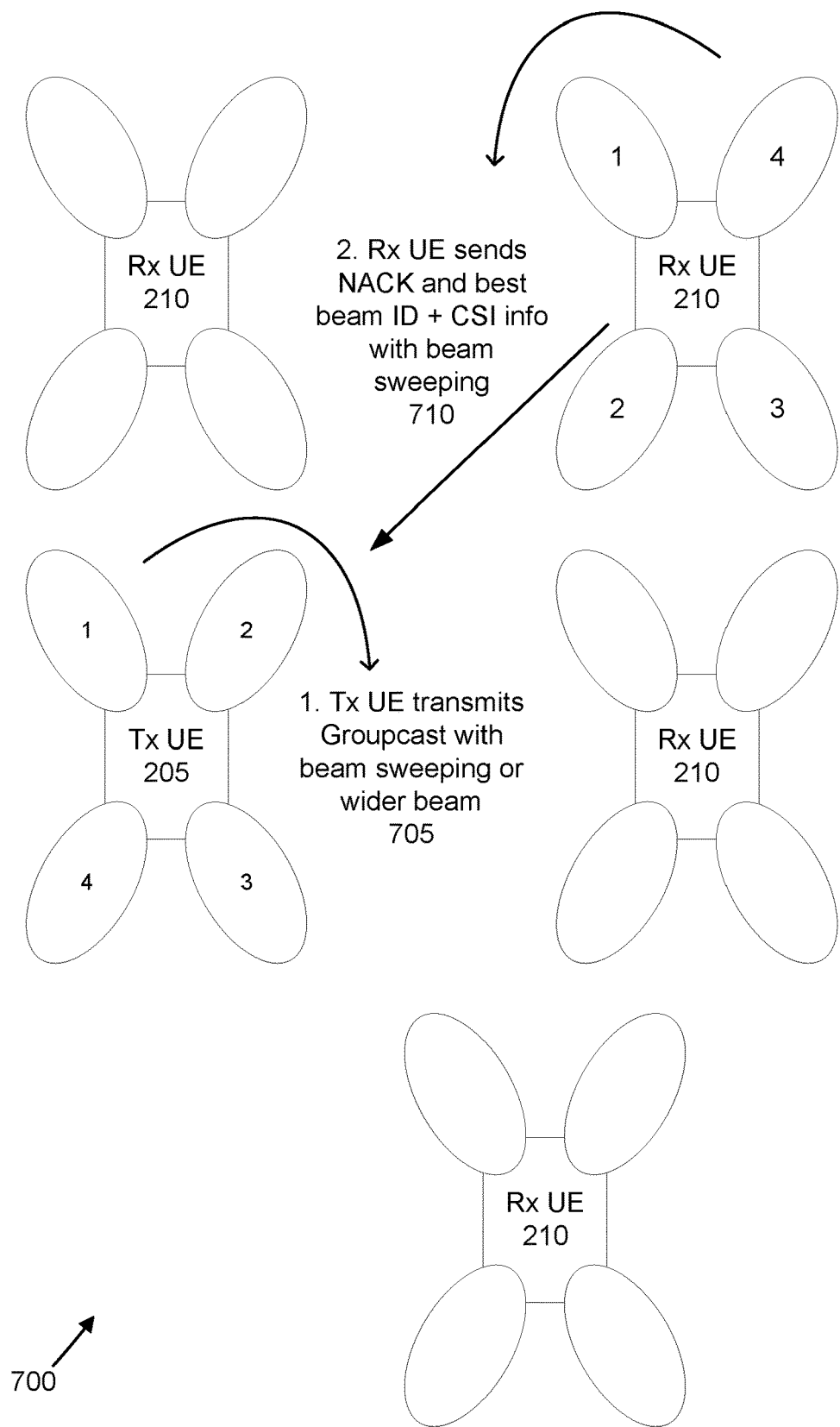
FIG. 7 is a diagram illustrating another embodiment of Rx UE transmitting both HARQ feedback and beam/signal feedback.

FIG. 7 depicts a second Rx UE 210 feedback scenario 700, according to embodiments of the disclosure. The Rx UE 210 feedback scenario 700 involves the Tx UE 205 sending a groupcast transmission 705 to the group of Rx UEs 210. Here, the groupcast transmission 705 corresponds to the initial transmission of groupcast data. In certain embodiments, the groupcast transmission is achieved using beam sweeping. In certain embodiments, the groupcast transmission is sent using over a plurality of (wider) beams.

In the scenario 700, at least one Rx UE 210 does not successfully decode the groupcast signal. Here, the upper-right hand Rx UE 210 fails to decode the groupcast TB. Accordingly, the Rx UE 210 sends "enhanced" NACK feedback 710. Here, the enhanced feedback 710 may be as described above with reference to FIG. 4 and may include, for example, a HARQ ACK/NACK indication, a best beam ID and S-CSI information.

Additionally, in the scenario 700, the Rx UE(s) 210 transmits the NACK feedback 710 using beam sweeping, i.e., transmitting the NACK(s) using one or more beams towards the Tx UE 205 in the same or different time slot. In this case, the Rx UE 210(s) can transmit the NACK(s) on a dedicated resource which are semi-statically configured. Additionally, the configuration of periodicity/time slot may be semi-static or (pre)configured. In some embodiments, the Tx UE 205 determines the best beam ID for retransmission based on the enhanced feedback 710 from the Rx UE 210. In other embodiments, the Tx UE 205 implicitly determines the best beam from the HARQ-ACK or HARQ-NACK reception from the Rx UE 210.

Figure 8:
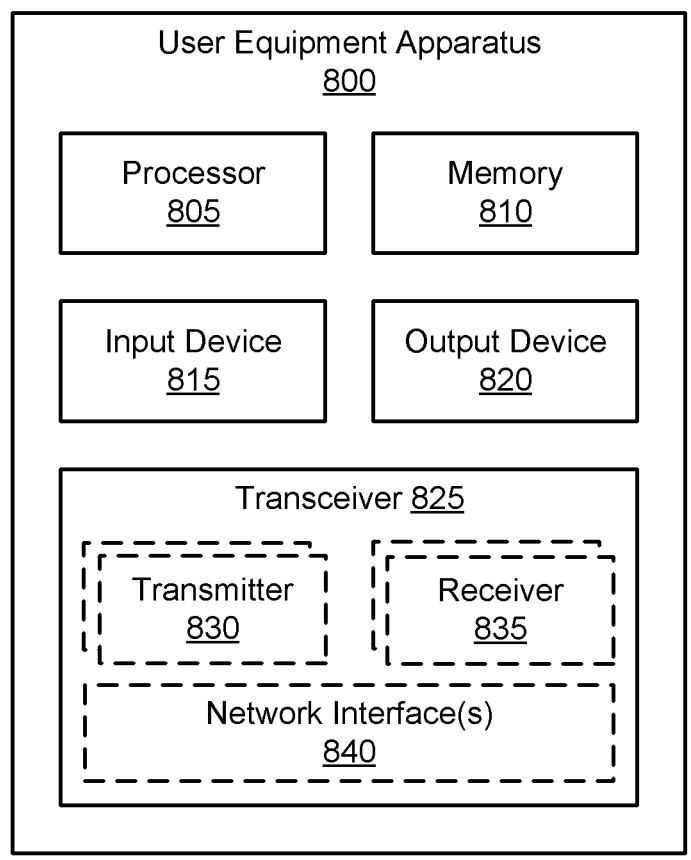
FIG. 8 is a diagram illustrating one embodiment of a network function apparatus that may be used for selective retransmission of groupcast data.

FIG. 8 depicts a user equipment apparatus 800 that may be used for groupcast with beamformed selective transmission/retransmission, according to embodiments of the disclosure. In various embodiments, the user equipment apparatus 800 is used to implement one or more of the solutions described above. The user equipment apparatus 800 may be one embodiment of the AMF, described above. Furthermore, the user equipment apparatus 800 may include a processor 805, a memory 810, an input device 15, an output device 820, and a transceiver 825. In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the user equipment apparatus 800 performs sidelink communication (e.g., via the transceiver 825). Here, the processor 805 may controls the user equipment apparatus 800 to achieve the UE behaviors described herein.

In some embodiments, the user equipment apparatus 800 is a Tx UE 205. In such embodiments, the transceiver 825 transmits groupcast data via sidelink communication to a set of UEs (e.g., Rx UEs 210) and receives negative acknowledgement feedback via sidelink communication from at least one UE of the set, the negative acknowledgement feedback indicating unsuccessful reception of the groupcast data. The processor 805 may then determine a retransmission mode based on a number of UEs sending negative acknowledgement feedback. Further, the processor 805 controls the transceiver 825 to send selectively beamformed retransmission of the groupcast data according to the determined retransmission mode.

In certain embodiments, the retransmission(s) of the groupcast data is/are only sent to those UEs that transmitted negative acknowledgement feedback. In one embodiment, the retransmission mode is unicast retransmission with beamforming. In another embodiment, the retransmission mode is groupcast with partial beam sweeping. In some embodiments, the processor 805 further determines the retransmission mode based on a QoS priority of the groupcast data.

In some embodiments, the transceiver 825 receives a sidelink groupcast HARQ retransmission profile from a base station in a mobile communication network (e.g., a RAN node, such as gNB or eNB). In various embodiments, the sidelink communication does not pass through the base station. In certain embodiments, the base station indicates a pool of feedback resources for sidelink communication.

In various embodiments, transmitting the groupcast data includes the transceiver 825 transmitting two or more data TBs simultaneously using different antenna panels. In some embodiments, the transceiver 825 further transmits SCI to the set of UEs. In certain embodiments, the SCI includes a data transmission index and a transmission occasion. In certain embodiments, the SCI indicates a PSFCH format for feedback. In such embodiments, the at least one UE transmits the negative acknowledgement using the indicated PSFCH format.

In some embodiments, receiving negative acknowledgement feedback includes receiving best beam information from the at least one UE. In such embodiments, the processor 805 may select one or more beams using the best beam information. In further embodiments, sending selectively beamformed retransmission of the groupcast data includes the transceiver 825 retransmitting on the selected one or more beams.

In some embodiments, receiving negative acknowledgement feedback includes receiving location information for the at least one UE. In such embodiments, the processor 805 may select one or more beams using the location information. In further embodiments, sending selectively beamformed retransmission of the groupcast data includes the transceiver 825 retransmitting on the selected one or more beams.

In some embodiments, the user equipment apparatus 800 is a Tx UE 205. In such embodiments, the transceiver 825 receives a groupcast signal from a Tx UE 205 and the processor 805 detects the unsuccessful decoding the groupcast signal. The processor 805 then determines best beam information and sends feedback to the Tx UE 205 via the transceiver 825. Here, the feedback includes a negative acknowledgement and the best beam information.

In some embodiments, the transceiver 825 receives a sidelink reference signal associated with the groupcast signal and the processor 805 derives the best beam information using the sidelink reference signal.

In some embodiments, the transceiver 825 receives SCI prior to receiving the groupcast signal. In such embodiments, the SCI may be received together with a sidelink reference signal associated with the groupcast signal.

In some embodiments sending feedback to the Tx UE 205 includes transmitting the feedback towards the Tx UE 205 using beam sweeping. In some embodiments, the feedback includes sidelink channel state information.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to groupcast with beamformed selective transmission/retransmission. For example, the memory 810 may store beam indices, CSI information, HARQ feedback, groupcast data, and the like. In certain embodiments, the memory 810 also stores program code and related data, such as an operating system or other controller algorithms operating on the remote unit 105.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

As discussed above, the transceiver 825 communicates with one or more UEs via sidelink. Additionally, the transceiver 825 communicates with one or more network functions of a mobile communication network via one or more access networks. The transceiver 825 operates under the control of the processor 805 to transmit messages, data, and other signals and also to receive messages, data, and other signals. For example, the processor 805 may selectively activate the transceiver 825 (or portions thereof) at particular times in order to send and receive messages.

The transceiver 825 may include one or more transmitters 830 and one or more receivers 835. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. Additionally, the transceiver 825 may support at least one network interface 840. Here, the at least one network interface 840 facilitates communication with a RAN node, such as an eNB or gNB, for example using the "Uu" interface. Additionally, the at least one network interface 840 may include an interface used for communications with one or more network functions in the mobile core network, such as a UPF, an AMF, and/or a SMF.

In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an application-specific integrated circuit ("ASIC"), or other type of hardware component. In certain embodiments, one or more transmitters 830 and/or one or more receivers 835 may be implemented and/or integrated into a multi-chip module. In some embodiments, other components such as the network interface 840 or other hardware components/circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
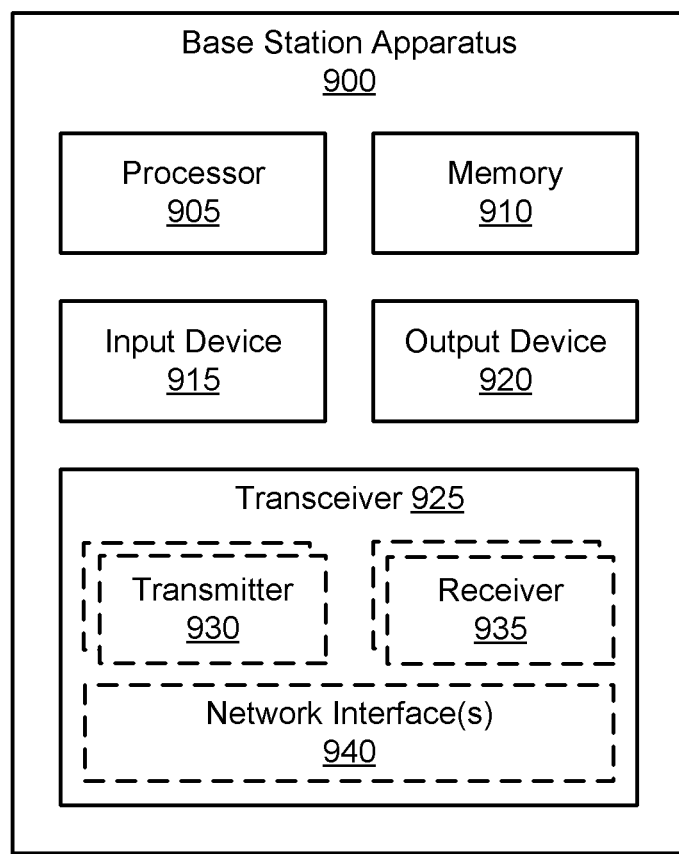
FIG. 9 is a diagram illustrating one embodiment of a network function apparatus that may be used for groupcast with beamformed selective transmission/retransmission.

FIG. 9 depicts a base station apparatus 900 that may be used for groupcast with beamformed selective transmission/retransmission m, according to embodiments of the disclosure. The base station apparatus 900 may be one embodiment of the remote unit 105 or UE, described above. Furthermore, the base station apparatus 900 may include a processor 905, a memory 910, an input device 915, an output device 920, and a transceiver 925. In some embodiments, the input device 915 and the output device 920 are combined into a single device, such as a touchscreen. In certain embodiments, the base station apparatus 900 may not include any input device 915 and/or output device 920. In various embodiments, the base station apparatus 900 may include one or more of: the processor 905, the memory 910, and the transceiver 925, and may not include the input device 915 and/or the output device 920.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the base station apparatus 900 operates according to the gNB/eNB behaviors described herein. Specifically, the processor 905 may configure one or more UEs with a sidelink groupcast HARQ retransmission profile. Thereafter, the UEs may select a sidelink retransmission mode (e.g., N-unicast transmission with beamforming or Groupcast with partial beamsweeping) according to the configured sidelink groupcast HARQ retransmission profile. As described above, the criteria for sidelink retransmission mode selection may include the number of UEs sending NACK and/or the QoS priority of the initial groupcast transmission.

In some embodiments, the processor 905 may configure one or more UEs with a pool of feedback resources for sidelink communication. In some embodiments, the processor 905 may determine location assistance information for one or more UEs (e.g., vehicular UEs). In such embodiments, the processor 905 may control the transceiver 925 to send the location assistance information to at least one UE using sidelink communication, wherein the location assistance information is used by the UE for beam selection and/or determining the number of beams to use for data transmission.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to groupcast with beamformed selective transmission/retransmission. For example, the memory 910 may store HARQ resources, TA values, UE configurations, and the like. In certain embodiments, the memory 910 also stores program code and related data, such as an operating system or other controller algorithms operating on the remote unit 105.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the base station apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all or portions of the output device 920 may be integrated with the input device 915. For example, the input device 915 and output device 920 may form a touchscreen or similar touch-sensitive display. In other embodiments, the output device 920 may be located near the input device 915.

The transceiver 925 includes at least transmitter 930 and at least one receiver 935. One or more transmitters 930 may be used to communicate with the UE, as described herein. Similarly, one or more receivers 935 may be used to communicate with other network functions in the PLMN, as described herein. Although only one transmitter 930 and one receiver 935 are illustrated, the base station apparatus 900 may have any suitable number of transmitters 930 and receivers 935. Further, the transmitter(s) 925 and the receiver(s) 930 may be any suitable type of transmitters and receivers.

Figure 10:
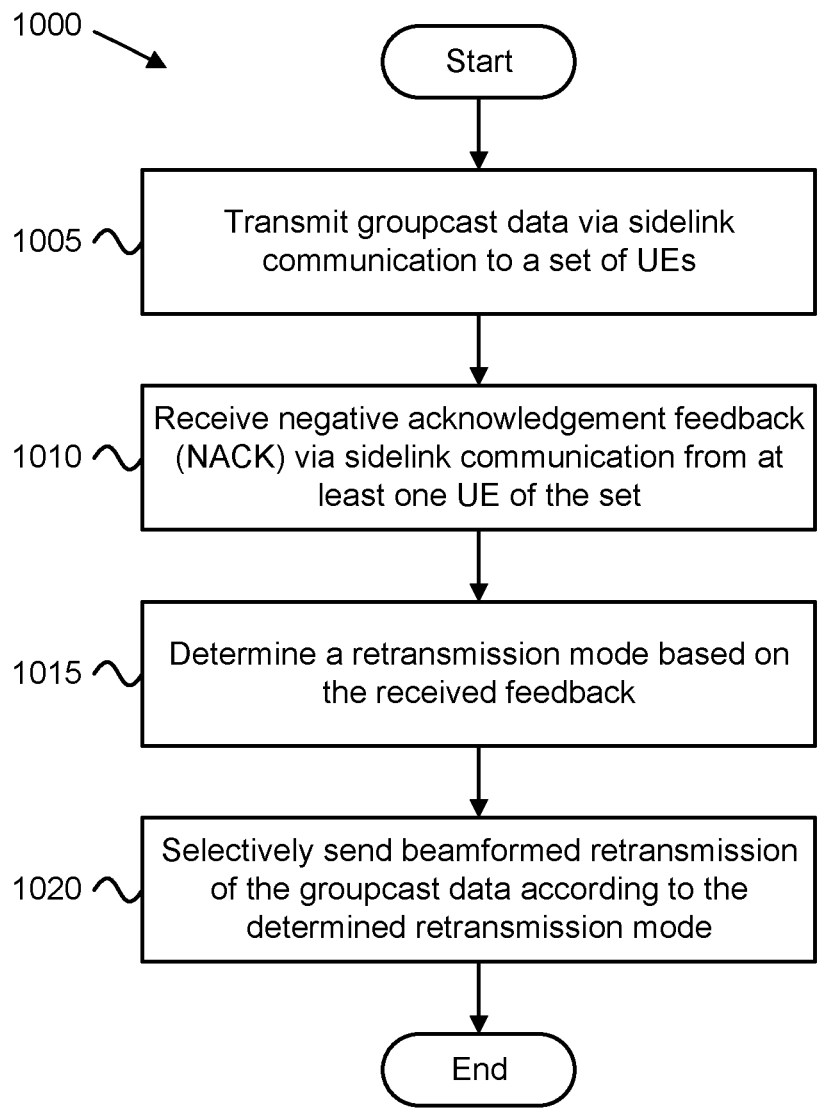
FIG. 10 is a flowchart diagram illustrating one embodiment of a method for selective retransmission of groupcast data.

FIG. 10 depicts one embodiment of a method 1000 for selective retransmission of groupcast data, according to embodiments of the disclosure. In various embodiments, the method 1000 is performed by remote unit 105, the Tx UE 205, and/or the user equipment apparatus 800, described above. In some embodiments, the method 1000 is performed by a processor, such as a microcontroller, a microprocessor, a CPU, a GPU, an auxiliary processing unit, a FPGA, or the like.

The method 1000 begins and transmits 1005 groupcast data via sidelink communication to a set of UEs (e.g., Rx UEs 210). The method 1000 includes receiving 1010 negative acknowledgement feedback via sidelink communication from at least one UE of the set. Here, the negative acknowledgement feedback indicate unsuccessful reception of the groupcast data. The method 1000 includes determining 1015 a retransmission mode based on the received feedback. In some embodiments, the determination of the retransmission mode is determined based on a number of UEs sending negative acknowledgement feedback. The method 1000 includes selectively sending 1020 beamformed retransmission of the groupcast data according to the determined retransmission mode. The method 1000 ends.

Figure 11:
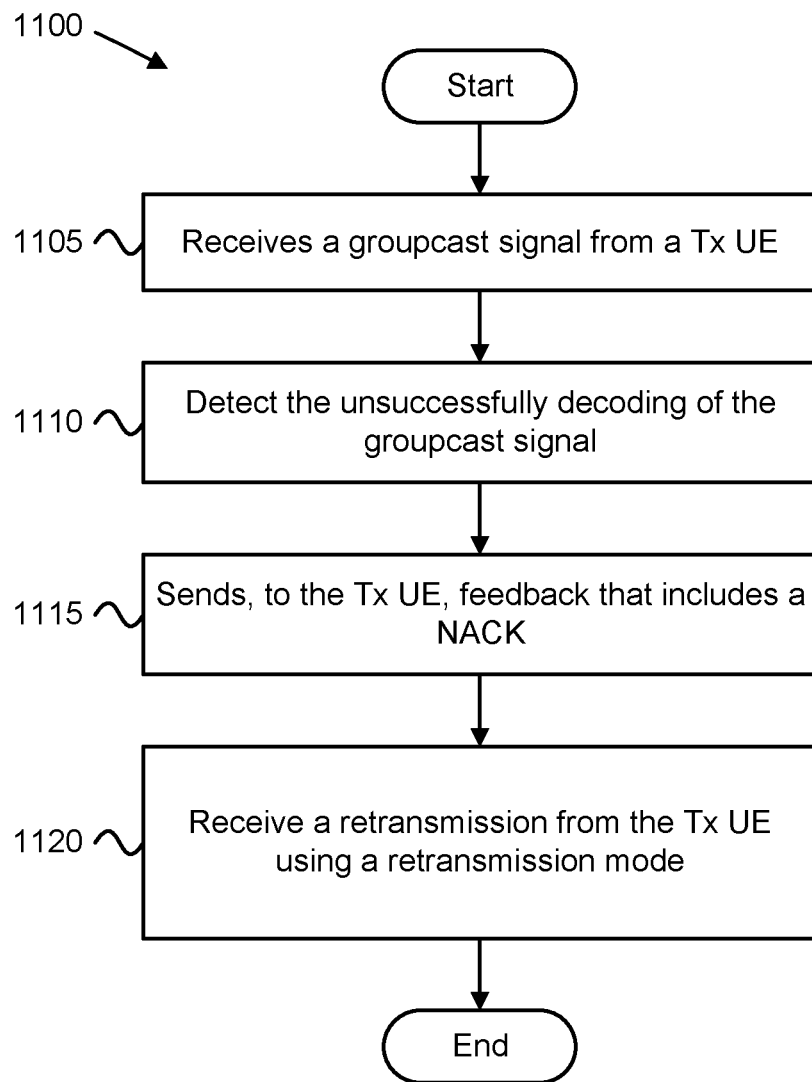
FIG. 11 is a flowchart diagram illustrating one embodiment of a method for selective retransmission of groupcast data.

FIG. 11 depicts one embodiment of a method 1100 for selective retransmission of groupcast data, according to embodiments of the disclosure. In various embodiments, the method 1100 is performed by the remote unit 105, the Rx UE 210, and/or the user equipment apparatus 800, described above. In some embodiments, the method 1100 is performed by a processor, such as a microcontroller, a microprocessor, a CPU, a GPU, an auxiliary processing unit, a FPGA, or the like.

The method 1100 begins and receives 1105 a groupcast signal from a Tx UE. The method 1100 includes detecting 1110 the unsuccessfully decoding of the groupcast signal. The method 1100 includes sending 1115, to the Tx UE, feedback that include a negative acknowledgment ("NACK"). The method 1100 includes receiving a retransmission from the Tx UE using a retransmission mode. The method 1100 ends.

Figure 12:
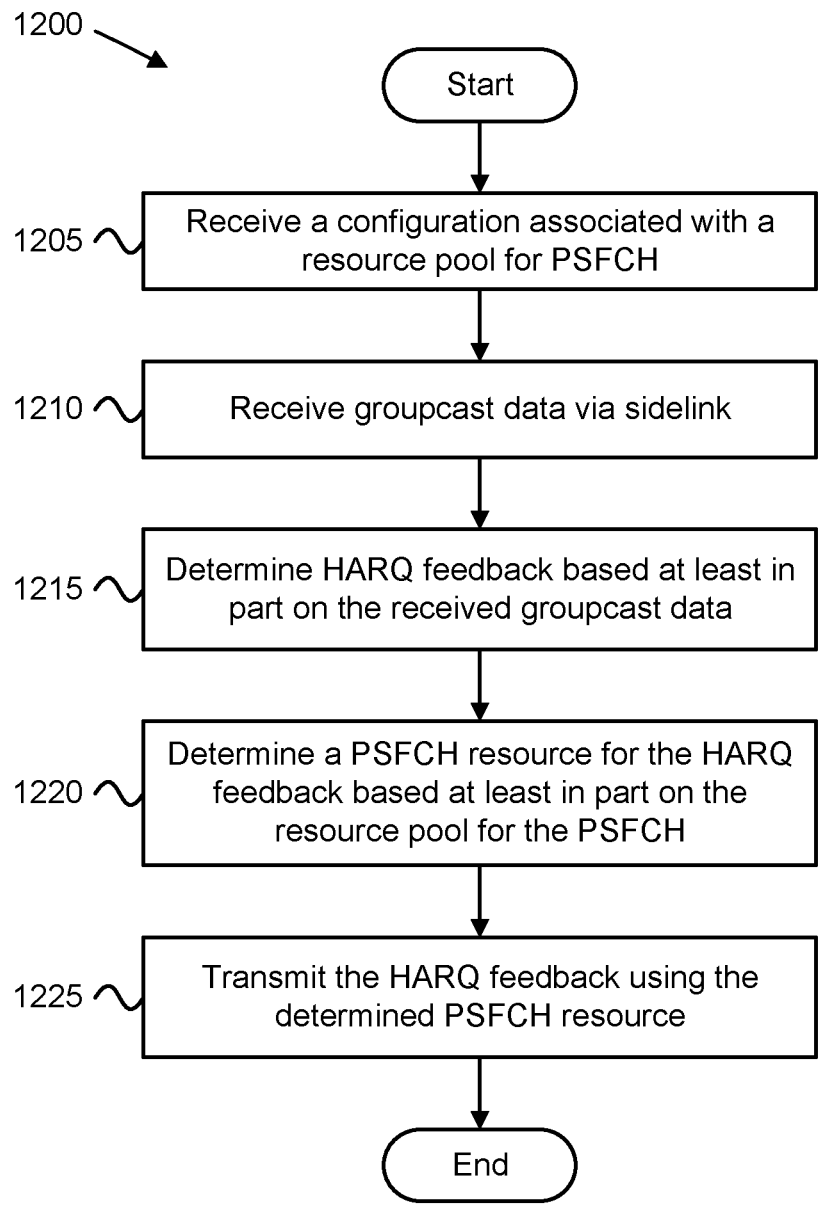
FIG. 12 is a flowchart diagram illustrating one embodiment of a method performed by a UE in accordance with aspects of the present disclosure.

FIG. 12 depicts one embodiment of a method 1200 for selective retransmission of groupcast data, according to embodiments of the disclosure. In various embodiments, the method 1200 is performed by the remote unit 105, the Rx UE 210, and/or the user equipment apparatus 800, described above. In some embodiments, the method 1200 is performed by a processor, such as a microcontroller, a microprocessor, a CPU, a GPU, an auxiliary processing unit, a FPGA, or the like.

The method 1200 begins and receives 1205 (e.g., from a gNB) a configuration associated with a resource pool for PSFCH. The method 1200 includes receiving 1210 groupcast data (e.g., from a Tx UE) via sidelink. The method 1200 includes determining 1215 HARQ feedback based at least in part on the received groupcast data. The method 1200 includes determining 1220 a PSFCH resource for the HARQ feedback based at least in part on the resource pool for the PSFCH. The method 1200 includes transmitting 1225 the HARQ feedback (e.g., to the Tx UE) using the determined PSFCH resource. The method 1200 ends.

Disclosed herein is a first apparatus for selective retransmission of groupcast data, according to embodiments of the disclosure. The first apparatus may be implemented by the remote unit 105, the Tx UE 205, and/or the user equipment apparatus 800. The first apparatus includes a transceiver that transmits groupcast data via sidelink communication to a set of UEs (e.g., Rx UEs 210) and receives negative acknowledgement feedback via sidelink communication from at least one UE of the set, the negative acknowledgement feedback indicating unsuccessful reception of the groupcast data. The first apparatus includes a processor that determines a retransmission mode based on a number of UEs sending negative acknowledgement feedback and controls the transceiver to send selectively beamformed retransmission of the groupcast data according to the determined retransmission mode.

In certain embodiments, the retransmission(s) of the groupcast data is/are only sent to those UEs that transmitted negative acknowledgement feedback. In one embodiment, the retransmission mode is unicast retransmission with beamforming. In another embodiment, the retransmission mode is groupcast with partial beam sweeping. In some embodiments, determining the retransmission mode is further based on a QoS priority of the groupcast data.

In some embodiments, the transceiver receives a sidelink groupcast HARQ retransmission profile from a base station in a mobile communication network. In various embodiments, the sidelink communication does not pass through the base station. In certain embodiments, the base station indicates a pool of feedback resources for sidelink communication.

In some embodiments, the transceiver further transmits SCI to the set of UEs. In certain embodiments, the SCI includes a data transmission index and a transmission occasion. In certain embodiments, the SCI indicates a PSFCH format for feedback. In such embodiments, the at least one UE transmits the negative acknowledgement using the indicated PSFCH format.

In some embodiments, receiving negative acknowledgement feedback includes receiving best beam information from the at least one UE. In such embodiments, the processor may select one or more beams using the best beam information. In further embodiments, sending selectively beamformed retransmission of the groupcast data includes the transceiver retransmitting on the selected one or more beams.

In some embodiments, receiving negative acknowledgement feedback includes receiving location information for the at least one UE. In such embodiments, the processor may select one or more beams using the location information. In further embodiments, sending selectively beamformed retransmission of the groupcast data includes the transceiver retransmitting on the selected one or more beams.

In various embodiments, transmitting the groupcast data includes transmitting two or more data TBs simultaneously using different antenna panels.

Disclosed herein is a first method for selective retransmission of groupcast data, according to embodiments of the disclosure. The first method may be performed by the remote unit 105, the Tx UE 205, and/or the user equipment apparatus 800. The first method includes transmitting groupcast data via sidelink communication to a set of UEs (e.g., Rx UEs 210) and receiving negative acknowledgement feedback via sidelink communication from at least one UE of the set. Here, the negative acknowledgement feedback indicating unsuccessful reception of the groupcast data. The first method includes determining a retransmission mode based on a number of UEs sending negative acknowledgement feedback and sending selectively beamformed retransmission of the groupcast data according to the determined retransmission mode.

In certain embodiments, the retransmission(s) of the groupcast data is/are only sent to those UEs that transmitted negative acknowledgement feedback. In one embodiment, the retransmission mode is unicast retransmission with beamforming. In another embodiment, the retransmission mode is groupcast with partial beam sweeping. In some embodiments, determining the retransmission mode is further based on a QoS priority of the groupcast data.

In some embodiments, the first method further includes receiving a sidelink groupcast HARQ retransmission profile from a base station in a mobile communication network. In various embodiments, the sidelink communication does not pass through the base station.

In some embodiments, the first method further includes transmitting SCI to the set of UEs. In certain embodiments, the sidelink control information includes a data transmission index and a transmission occasion. In certain embodiments, the sidelink control information indicates a PSFCH format for feedback, wherein the at least one UE transmits the negative acknowledgement using the indicated PSFCH format.

In some embodiments, receiving negative acknowledgement feedback includes receiving best beam information from the at least one UE. In such embodiments, sending selectively beamformed retransmission of the groupcast data includes retransmitting on one or more beams selected using the best beam information.

In some embodiments, receiving negative acknowledgement feedback includes receiving location information for the at least one UE. In such embodiments, sending selectively beamformed retransmission of the groupcast data includes retransmitting on one or more beams selected using the location information.

In various embodiments, transmitting the groupcast data includes transmitting two or more data TBs simultaneously using different antenna panels.

Disclosed herein is a second apparatus for selective retransmission of groupcast data, according to embodiments of the disclosure. The second apparatus may be implemented by the remote unit 105, the Rx UE 210, and/or the user equipment apparatus 800. The second apparatus includes a transceiver that receives a groupcast signal from a Tx UE and a processor that detects the unsuccessful decoding the groupcast signal. The processor determines best beam information and sends feedback to the Tx UE via the transceiver. Here, the feedback includes a negative acknowledgement and the best beam information.

In some embodiments, the transceiver receives a sidelink reference signal associated with the groupcast signal, wherein the processor derives the best beam information using the sidelink reference signal. In some embodiments, the feedback includes sidelink channel state information.

In some embodiments, the transceiver receives SCI prior to receiving the groupcast signal. In such embodiments, the SCI is received together with a sidelink reference signal associated with the groupcast signal. In some embodiments sending feedback to the Tx UE includes transmitting the feedback towards the Tx UE using beam sweeping.

Disclosed herein is a second method for selective retransmission of groupcast data, according to embodiments of the disclosure. The second method may be performed by the remote unit 105, the Rx UE 210, and/or the user equipment apparatus 800. The second method includes receiving a groupcast signal from a Tx UE and unsuccessfully decoding the groupcast signal. In response to the unsuccessful decoding, the second method includes determining best beam information and sending feedback to the Tx UE. Here, the feedback includes a negative acknowledgement and the best beam information.

In some embodiments, the second method includes receiving a sidelink reference signal associated with the groupcast signal, wherein the best beam information is derived using the sidelink reference signal. In some embodiments, the feedback includes sidelink channel state information.

In some embodiments, the second method includes receiving SCI prior to receiving the groupcast signal. In certain embodiments, the SCI is received together with a sidelink reference signal associated with the groupcast signal. In some embodiments, sending feedback to the Tx UE includes transmitting the feedback towards the Tx UE using beam sweeping.

Disclosed herein is a third apparatus for selective retransmission of groupcast data, according to embodiments of the disclosure. The third apparatus may be implemented by the remote unit 105, the Tx UE 205, and/or the user equipment apparatus 800. The third apparatus includes a processor coupled to a transceiver, the processor configured to cause the third apparatus to A) transmit groupcast data via sidelink communication to a set of UEs (e.g., Rx UEs 210); B) receive negative acknowledgement feedback via sidelink communication from at least one UE of the set, the negative acknowledgement feedback indicating unsuccessful reception of the groupcast data; C) determine a retransmission mode based on the feedback; and D) send selectively beamformed retransmission(s) of the groupcast data according to the determined retransmission mode.

In some embodiments, the initial transmission of the groupcast data is performed using a first cast-type and the determined retransmission mode indicates a second cast-type different than the first cast-type. In one embodiment, the second cast-type is unicast retransmission with beamforming. In another embodiment, the second cast-type is groupcast with partial beam sweeping.

In certain embodiments, the retransmission(s) of the groupcast data is/are only sent to those UEs that transmitted negative acknowledgement feedback. In some embodiments, determining the retransmission mode is further based on a QoS priority of the groupcast data.

In some embodiments, the processor is further configured to cause the third apparatus to receive a sidelink groupcast HARQ retransmission profile from a base station in a mobile communication network. In various embodiments, the sidelink communication does not pass through the base station. In certain embodiments, the base station indicates a pool of feedback resources for sidelink communication.

In some embodiments, the processor is further configured to cause the third apparatus to transmit SCI to the set of UEs. In certain embodiments, the SCI includes a data transmission index and a transmission occasion. In certain embodiments, the SCI indicates a PSFCH format for feedback. In such embodiments, the third apparatus receives the negative acknowledgement feedback from the at least one UE using the indicated PSFCH format.

In some embodiments, to receive the negative acknowledgement feedback, the processor is configured to cause the third apparatus to receive best beam information from the at least one UE. In such embodiments, the processor is further configured to cause the third apparatus to select one or more beams using the best beam information. In further embodiments, to send the selectively beamformed retransmission of the groupcast data, the processor is configured to cause the third apparatus to retransmit on the selected one or more beams.

In some embodiments, to receive the negative acknowledgement feedback, the processor is configured to cause the third apparatus to receive location information for the at least one UE. In such embodiments, the processor may select one or more beams using the location information. In further embodiments, to send the selectively beamformed retransmission of the groupcast data, the processor is configured to cause the third apparatus to retransmit on the selected one or more beams.

In some embodiments, the processor is further configured to cause the third apparatus to implicitly determine a best beam for retransmission based on information of a beam used by a respective UE from the set of UEs to transit HARQ feedback for the groupcast data. In various embodiments, to transmit the groupcast data, the processor is configured to transmit two or more data TB s simultaneously using different antenna panels. In some embodiments, the processor is further configured to cause the apparatus to determine the retransmission mode based on a number of UEs sending a respective negative acknowledgement feedback.

Disclosed herein is a third method for selective retransmission of groupcast data, according to embodiments of the disclosure. The third method may be performed by the remote unit 105, the Tx UE 205, and/or the user equipment apparatus 800. The third method includes transmitting groupcast data via sidelink communication to a set of UEs (e.g., Rx UEs 210) and receiving negative acknowledgement feedback via sidelink communication from at least one UE of the set. Here, the negative acknowledgement feedback indicating unsuccessful reception of the groupcast data. The third method includes determining a retransmission mode based on the received feedback and sending selectively beamformed retransmission(s) of the groupcast data according to the determined retransmission mode.

In some embodiments, the initial transmission of the groupcast data is performed using a first cast-type and the determined retransmission mode indicates a second cast-type different than the first cast-type. In one embodiment, the second cast-type is unicast retransmission with beamforming. In another embodiment, the second cast-type is groupcast with partial beam sweeping.

In certain embodiments, the retransmission(s) of the groupcast data is/are only sent to those UEs that transmitted negative acknowledgement feedback. In some embodiments, determining the retransmission mode is further based on a QoS priority of the groupcast data.

In some embodiments, the third method further includes receiving a sidelink groupcast HARQ retransmission profile from a base station in a mobile communication network. In various embodiments, the sidelink communication does not pass through the base station. In certain embodiments, the base station indicates a pool of feedback resources for sidelink communication.

In some embodiments, the third method further includes transmitting SCI to the set of UEs. In certain embodiments, the SCI includes a data transmission index and a transmission occasion. In certain embodiments, the SCI indicates a PSFCH format for feedback. In such embodiments, the negative acknowledgement feedback is received from the at least one UE using the indicated PSFCH format.

In some embodiments, receiving the negative acknowledgement feedback comprises receiving best beam information from the at least one UE. In such embodiments, the third method further includes selecting one or more beams using the best beam information. In further embodiments, sending the selectively beamformed retransmission of the groupcast data comprises retransmitting on the selected one or more beams.

In some embodiments, receiving the negative acknowledgement feedback comprises receiving location information for the at least one UE. In such embodiments, the third method further includes using the location information. In further embodiments, sending the selectively beamformed retransmission of the groupcast data comprises retransmitting on the selected one or more beams.

In some embodiments, implicitly determining a best beam for retransmission based on information of a beam used by a respective UE from the set of UEs to transit HARQ feedback for the groupcast data. In various embodiments, transmitting the groupcast data includes transmitting two or more data TB s simultaneously using different antenna panels. In some embodiments, the third method further includes determining the retransmission mode based on a number of UEs sending a respective negative acknowledgement feedback.

Disclosed herein is a fourth apparatus for selective retransmission of groupcast data, according to embodiments of the disclosure. The fourth apparatus may be implemented by the remote unit 105, the Rx UE 210, and/or the user equipment apparatus 800. The fourth apparatus includes a processor coupled to a transceiver, the processor configured to cause the fourth apparatus to A) receive a groupcast signal from a Tx UE; B) detect the unsuccessful decoding the groupcast signal; C) send feedback to the Tx UE that includes a negative acknowledgement; and D) receive a retransmission from the Tx UE using a retransmission mode.

In some embodiments, the initial reception of the groupcast data is performed using a first cast-type and the retransmission mode comprises a second cast-type different than the first cast-type. In one embodiment, the second cast-type is unicast retransmission with beamforming. In another embodiment, the second cast-type is groupcast with partial beam sweeping.

In some embodiments, the processor is further configured to cause the fourth apparatus to A) receive a sidelink reference signal associated with the groupcast signal; and B) derive sidelink channel state information using the sidelink reference signal. In some embodiments, the feedback includes sidelink channel state information. In some embodiments, the sidelink channel state information includes best beam information.

In some embodiments, the transceiver receives SCI prior to receiving the groupcast signal. In such embodiments, the SCI is received together with a sidelink reference signal associated with the groupcast signal. In some embodiments, to send the feedback to the Tx UE, the processor is configured to cause the fourth apparatus to transmit the feedback towards the Tx UE using beam sweeping.

Disclosed herein is a fourth method for selective retransmission of groupcast data, according to embodiments of the disclosure. The fourth method may be performed by the remote unit 105, the Rx UE 210, and/or the user equipment apparatus 800. The fourth method includes receiving a groupcast signal from a Tx UE and unsuccessfully decoding the groupcast signal. In response to the unsuccessful decoding, the fourth method includes sending feedback to the Tx UE and receiving a retransmission from the Tx UE using a retransmission mode. Here, the feedback includes a negative acknowledgement and the best beam information.

In some embodiments, the initial reception of the groupcast data is performed using a first cast-type and the retransmission mode comprises a second cast-type different than the first cast-type. In one embodiment, the second cast-type is unicast retransmission with beamforming. In another embodiment, the second cast-type is groupcast with partial beam sweeping.

In some embodiments, the fourth method includes receiving a sidelink reference signal associated with the groupcast signal, wherein sidelink channel state information is derived using the sidelink reference signal. In some embodiments, the feedback includes sidelink channel state information. In some embodiments, the sidelink channel state information includes best beam information.

In some embodiments, the fourth method includes receiving SCI prior to receiving the groupcast signal. In certain embodiments, the SCI is received together with a sidelink reference signal associated with the groupcast signal. In some embodiments, sending feedback to the Tx UE includes transmitting the feedback towards the Tx UE using beam sweeping.

Disclosed herein is a fifth method, in accordance with aspects of the present disclosure. The fifth method may be performed by the remote unit 105, the Rx UE 210, and/or the user equipment apparatus 800. The fifth method includes receiving (e.g., from a gNB) a configuration associated with a resource pool for PSFCH. The fifth method includes receiving groupcast data (e.g., from a Tx UE) via sidelink and determining HARQ feedback based at least in part on the received groupcast data. The fifth method includes determining a PSFCH resource for the HARQ feedback based at least in part on the resource pool for the PSFCH and transmitting the HARQ feedback (e.g., to the Tx UE) using the determined PSFCH resource.

In some embodiments, receiving the groupcast data includes receiving a PSCCH transmission comprising SCI, where the SCI indicates a groupcast transmission. In certain embodiments, the SCI indicates a set of values for the HARQ feedback, wherein the set of values includes a first value indicating a positive acknowledgement (ACK) and a second value indicating a negative acknowledgement (NACK). In certain embodiments, the SCI indicates a data transmission index and a transmission occasion.

In some embodiments, to determine the PSFCH resource, the fifth method includes selecting the PSFCH resource from a subset of the resource pool. In certain embodiments, the determined PSFCH resource is selected based on a member identifier associated with the UE. In some embodiments, the determined PSFCH resource is within a PSFCH resource set configured within the resource pool, where the PSFCH resource set is semi-statically assigned to the UE for the HARQ feedback.

In certain embodiments, the subset of the resource pool is based on a QoS priority of the groupcast data. In one embodiment, the fifth method includes receiving a PSCCH transmission comprising SCI associated with the groupcast data, where the SCI indicates the QoS priority of the groupcast data.

In certain embodiments, the resource pool is configured with a first pool of PSFCH resources, and wherein the subset of the resource pool comprises a second pool of PSFCH resources within the first pool of PSFCH resources. In one embodiment, the second pool of PSFCH resources is determined based on SCI. In another embodiment, the second pool of PSFCH resources is indicated (e.g., provided) by a network entity (e.g., the gNB).

Disclosed herein is a UE that performs the fifth method, in accordance with aspects of the present disclosure. The UE may include at least one memory and at least one processor coupled with the at least one memory and configured to perform the fifth method. Specifically, the at least one processor may be configured to cause the UE to: A) receive (e.g., from a gNB) a configuration associated with a resource pool for PSFCH; B) receive groupcast data (e.g., from a Tx UE) via sidelink; C) determine HARQ feedback based at least in part on the received groupcast data; D) determine a PSFCH resource for the HARQ feedback based at least in part on the resource pool for the PSFCH; and E) transmit the HARQ feedback (e.g., to the Tx UE) using the determined PSFCH resource.

In some embodiments, to receive the groupcast data, the at least one processor is configured to cause the UE to receive a PSCCH transmission comprising SCI, where the SCI indicates a groupcast transmission. In certain embodiments, the SCI indicates a set of values for the HARQ feedback, wherein the set of values includes a first value indicating an ACK and a second value indicating a NACK. In certain embodiments, the SCI indicates a data transmission index and a transmission occasion.

In some embodiments, to determine the PSFCH resource, the at least one processor is configured to cause the UE to select the PSFCH resource from a subset of the resource pool. In certain embodiments, the determined PSFCH resource is selected based on a member identifier associated with the UE. In some embodiments, the determined PSFCH resource is within a PSFCH resource set configured within the resource pool, where the PSFCH resource set is semi-statically assigned to the UE for the HARQ feedback.

In certain embodiments, the subset of the resource pool is based on a QoS priority of the groupcast data. In one embodiment, the at least one processor is configured to cause the UE to receive a PSCCH transmission comprising SCI associated with the groupcast data, where the SCI indicates the QoS priority of the groupcast data.

In certain embodiments, the resource pool is configured with a first pool of PSFCH resources, and wherein the subset of the resource pool comprises a second pool of PSFCH resources within the first pool of PSFCH resources. In one embodiment, the at least one processor is configured to cause the UE to determine the second pool of PSFCH resources based on SCI. In another embodiment, the second pool of PSFCH resources is indicated (e.g., provided) by a network entity (e.g., the gNB).

Disclosed herein is a processor for wireless communication that performs the fifth method, in accordance with aspects of the present disclosure. The processor may include at least one controller coupled with at least one memory and configured to perform the fifth method. Specifically, the at least one controller may be configured to cause the processor to: A) receive (e.g., from a gNB) a configuration associated with a resource pool for PSFCH; B) receive groupcast data (e.g., from a Tx UE) via sidelink; C) determine HARQ feedback based at least in part on the received groupcast data; D) determine a PSFCH resource for the HARQ feedback based at least in part on the resource pool for the PSFCH; and E) transmit the HARQ feedback (e.g., to the Tx UE) using the determined PSFCH resource.

In some embodiments, to receive the groupcast data, the at least one controller is configured to cause the processor to receive a PSCCH transmission comprising SCI, where the SCI indicates a groupcast transmission. In certain embodiments, the SCI indicates a set of values for the HARQ feedback, wherein the set of values includes a first value indicating a ACK and a second value indicating a NACK. In certain embodiments, the SCI indicates a data transmission index and a transmission occasion.

In some embodiments, to determine the PSFCH resource, the at least one controller is configured to cause the processor to select the PSFCH resource from a subset of the resource pool. In certain embodiments, the determined PSFCH resource is selected based on a member identifier associated with the processor.

In certain embodiments, the resource pool is configured with a first pool of PSFCH resources, and wherein the subset of the resource pool comprises a second pool of PSFCH resources within the first pool of PSFCH resources. In one embodiment, the at least one controller is configured to cause the processor to determine the second pool of PSFCH resources based on SCI. In another embodiment, the second pool of PSFCH resources is indicated (e.g., provided) by a network entity (e.g., the gNB).

In some embodiments, the determined PSFCH resource is within a PSFCH resource set configured within the resource pool, where the PSFCH resource set is semi-statically assigned to the UE for the HARQ feedback.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE) for wireless communication, comprising:
at least one memory; and
at least one processor coupled with the at least one memory and configured to cause the UE to:
receive a configuration associated with a resource pool for physical sidelink feedback channel (PSFCH);
receive groupcast data via sidelink;
determine hybrid automatic repeat request (HARQ) feedback based at least in part on the received groupcast data;
determine a PSFCH resource for the HARQ feedback in response to the reception of the groupcast data and based on a member identifier associated with the UE, wherein the PSFCH resource is associated with the resource pool for the PSFCH; and
transmit the HARQ feedback using the determined PSFCH resource.

2. The UE of claim 1, wherein to receive the groupcast data, the at least one processor is configured to cause the UE to receive a physical sidelink control channel (PSCCH) transmission comprising sidelink control information (SCI), and wherein the SCI indicates a groupcast transmission.

3. The UE of claim 2, wherein the SCI indicates a set of values for the HARQ feedback, wherein the set of values includes a first value indicating a positive acknowledgement (ACK) and a second value indicating a negative acknowledgement (NACK).

4. The UE of claim 2, wherein the SCI indicates a data transmission index and a transmission occasion.

5. The UE of claim 1, wherein to determine the PSFCH resource, the at least one processor is configured to cause the UE to select the PSFCH resource from a subset of the resource pool.

6. The UE of claim 5, wherein the subset of the resource pool is based on a Quality of Service (QOS) priority of the groupcast data.

7. The UE of claim 6, wherein to receive the groupcast data, the at least one processor is configured to cause the UE to receive a physical sidelink control channel (PSCCH) transmission comprising sidelink control information (SCI), and wherein the SCI indicates the QoS priority of the groupcast data.

8. The UE of claim 5, wherein the resource pool is configured with a first pool of PSFCH resources, and wherein the subset of the resource pool comprises a second pool of PSFCH resources within the first pool of PSFCH resources.

9. The UE of claim 8, wherein the second pool of PSFCH resources is determined based on sidelink control information (SCI).

10. The UE of claim 8, wherein the second pool of PSFCH resources is indicated by a network entity.

11. The UE of claim 1, wherein the determined PSFCH resource is within a PSFCH resource set configured within the resource pool, wherein the PSFCH resource set is semi-statically assigned to the UE for the HARQ feedback.

12. A processor for wireless communication, comprising:
at least one controller coupled with at least one memory and configured to cause the processor to:
receive a configuration associated with a resource pool for physical sidelink feedback channel (PSFCH);
receive groupcast data via sidelink communication;
determine hybrid automatic repeat request (HARQ) feedback based at least in part on the received groupcast data;
determine a PSFCH resource for the HARQ feedback in response to the reception of the groupcast data and based on a member identifier associated with a user equipment (UE), wherein the PSFCH resource is associated with the resource pool for the PSFCH; and
transmit the HARQ feedback using the determined PSFCH resource.

13. The processor of claim 12, wherein to receive the groupcast data, the at least one controller is configured to cause the processor to receive a physical sidelink control channel (PSCCH) transmission comprising sidelink control information (SCI), and wherein the SCI indicates a groupcast transmission.

14. The processor of claim 13, wherein the SCI indicates a set of values for the HARQ feedback, wherein the set of values includes a first value indicating a positive acknowledgement (ACK) and a second values indicating a negative acknowledgement (NACK).

15. The processor of claim 13, wherein the SCI indicates a data transmission index and a transmission occasion.

16. The processor of claim 12, wherein to determine the PSFCH resource, the at least one controller is configured to cause the processor to select the PSFCH resource from a subset of the resource pool.

17. The processor of claim 16, wherein the resource pool is configured with a first pool of PSFCH resources, wherein the subset of the resource pool comprises a second pool of PSFCH resources within the first pool of PSFCH resources, and wherein the first pool of PSFCH resources is semi-statically assigned to the processor for the HARQ feedback.

18. The processor of claim 17, wherein the second pool of PSFCH resources is indicated by a network entity.

19. The processor of claim 12, wherein the determined PSFCH resource is within a PSFCH resource set configured within the resource pool, wherein the PSFCH resource set is semi-statically assigned to the UE for the HARQ feedback.

20. A method performed by a user equipment (UE), the method comprising:
receiving a configuration associated with a resource pool for physical sidelink feedback channel (PSFCH);
receiving groupcast data via sidelink communication;
determining hybrid automatic repeat request (HARQ) feedback based at least in part on the received groupcast data;
determining a PSFCH resource for the HARQ feedback in response to the reception of the groupcast data and based on a member identifier associated with the UE, wherein the PSFCH resource is associated with based at least in part on the resource pool for the PSFCH; and
transmitting the HARQ feedback using the determined PSFCH resource.

\* \* \* \* \*